(12) United States Patent
Hanada et al.

(10) Patent No.: US 12,552,405 B2
(45) Date of Patent: Feb. 17, 2026

(54) WORK VEHICLE WITH ANTENNA DEVICES FOR AUTONOMOUS TRAVEL

(71) Applicant: Yanmar Power Technology Co., Ltd., Osaka (JP)

(72) Inventors: Yosuke Hanada, Osaka (JP); Fumio Ishibashi, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 1524 days.

(21) Appl. No.: 16/963,198

(22) PCT Filed: Nov. 29, 2018

(86) PCT No.: PCT/JP2018/043993
§ 371 (c)(1),
(2) Date: Jul. 17, 2020

(87) PCT Pub. No.: WO2019/142506
PCT Pub. Date: Jul. 25, 2019

(65) Prior Publication Data
US 2021/0122391 A1 Apr. 29, 2021

(30) Foreign Application Priority Data
Jan. 18, 2018 (JP) .................................. 2018-006431

(51) Int. Cl.
*B60W 60/00* (2020.01)
*B60R 11/02* (2006.01)

(52) U.S. Cl.
CPC ........... *B60W 60/001* (2020.02); *B60R 11/02* (2013.01); *B60W 2300/15* (2013.01); *B60W 2756/10* (2020.02)

(58) Field of Classification Search
CPC ........... B60W 60/001; B60W 2300/15; B60W 2756/10; B60R 11/02; B60R 1/06;
(Continued)

(56) References Cited

U.S. PATENT DOCUMENTS 4,788,551 A 11/1988 Ishida
5,221,929 A 6/1993 Ott
(Continued)

FOREIGN PATENT DOCUMENTS

CN 202433527 U * 9/2012 ............ G01S 19/42
JP H03242005 A 10/1991
(Continued)

OTHER PUBLICATIONS

FarmProgress, "More precision from John Deere—StarFire 6000 Receiver", 2016, website link: https://www.farmprogress.com/farming-equipment/more-precision-from-john-deere-starfire-6000-receiver (Year: 2016).*

(Continued)

*Primary Examiner* — Ramya P Burgess
*Assistant Examiner* — Brittany Renee Peko
(74) *Attorney, Agent, or Firm* — Chris Mizumoto

(57) ABSTRACT

The present invention provides a work vehicle with which various antenna devices useful for autonomous travel and the like of the work vehicle can be mounted efficiently and the various antenna devices can be solidly supported. This work vehicle 1 is provided with a cabin 7, wherein a support frame 100 is fixed to a cabin frame 200 in the left-right width direction at an upper position on the outside of the cabin 7, and an antenna unit 50 on which an inertial measurement device, a GNSS antenna, and a wireless communication device are assembled, is attached to the support frame 100 while the inertial measurement device and the GNSS antenna are arranged in approximately the center position in the left-right width direction of the machine body.

9 Claims, 13 Drawing Sheets

(58) Field of Classification Search
CPC ......... G05D 2201/0201; G05D 1/0278; G05D 1/027; G05D 1/0088; G05D 1/021; G05D 2201/0213; A01B 69/007; A01B 69/00; B62D 49/00

See application file for complete search history.

(56) References Cited

U.S. PATENT DOCUMENTS

| | | | |
|---|---|---|---|
| 7,417,597 B1 * | 8/2008 | Lopez | H01Q 21/20 |
| | | | 343/799 |
| 2019/0248421 A1 * | 8/2019 | Jacobsthal | B62D 25/06 |
| 2019/0384321 A1 * | 12/2019 | Nishi | G05D 1/0278 |
| 2020/0032479 A1 * | 1/2020 | Hoshino | E02F 9/16 |

FOREIGN PATENT DOCUMENTS

| | | | | |
|---|---|---|---|---|
| JP | H03-121191 | | 12/1991 | |
| JP | 2005267568 A | * | 9/2005 | ........... B60R 25/102 |
| JP | 2008-102098 | | 5/2008 | |
| JP | 2009-177785 | | 8/2009 | |
| JP | 2010183325 A | * | 8/2010 | ............. H01Q 1/08 |
| JP | 2013173497 A | | 9/2013 | |
| JP | 2014-182453 | | 9/2014 | |
| JP | 2016002874 A | | 1/2016 | |
| JP | 2016094093 A | * | 5/2016 | ............. A01B 69/00 |
| JP | 2016095660 A | | 5/2016 | |
| JP | 2016-0223862 | | 12/2016 | |
| JP | 2017-211733 | | 11/2017 | |

OTHER PUBLICATIONS

Antenna tilting and mooring—Utility Model ApplicationMar. 15, 1972 Hiso Ono.

* cited by examiner

WORK VEHICLE WITH ANTENNA DEVICES FOR AUTONOMOUS TRAVEL

CROSS-REFERENCE

This application is a US National Stage Application under 35U.S.C. § 371 of International Application No. PCT/JP2018/043993 filed Nov. 29, 2018, which claims foreign priority of JP2018-006431 filed Jan. 18, 2018, the disclosures of which are hereby incorporated by reference in their entirety.

TECHNICAL FIELD

The present invention relates to a work vehicle with a cabin, and particularly relates to a work vehicle such as a tractor suitable for automatic traveling (including autonomous traveling) along a target traveling route while acquiring position information of the work vehicle by utilizing a Global Navigation Satellite System (GNSS).

BACKGROUND ART

For example, a tractor disclosed in Patent Literature 1 being an example of a work vehicle employing an autonomous traveling system includes a Global Positioning System (GPS) antenna (GNSS antenna) for acquiring satellite positioning information from a positioning satellite on an upper surface of a cabin roof of the work vehicle.

Specifically, on the upper surface of the cabin roof, a mounting stay having a substantially horizontal mounting seat at a higher position than the top surface of the cabin roof is formed in a portion including an intersection of a front-rear direction line at the approximate center position of the tread width of the vehicle body and a transverse direction line at the approximate center position of the wheel base, and the GPS antenna is mounted on the mounting seat of the mounting stay.

Further, if a GPS antenna with a gyro sensor is used for the GPS antenna, the inclination angle of the cabin roof can be also detected.

CITATION LIST

Patent Literature

Patent Literature 1: Japanese Unexamined Patent Application Publication No. 2016-2874

DISCLOSURE OF INVENTION

Problems to be Solved by the Invention

The above-described conventional technique discloses a technique for improving the detection accuracy of the GPS antenna or the detection accuracy of both the GPS antenna and the gyro sensor by elaborating the mounting position of the GPS antenna on the upper surface of the cabin roof.

However, the above-described autonomous traveling system is provided with various types of external devices separately from the work vehicle, such as a wireless communication terminal that issues various types of instructions to the work vehicle and a base station that acquires position information of the work vehicle.

Therefore, when the work vehicle actually autonomously travels, it is necessary to efficiently mount, on the work vehicle, not only the GPS antenna but also various types of antenna devices for communicating between the work vehicle and external devices. In this respect, the above-described conventional technique has room for improvement.

In addition, in the above-described conventional technique, the upper surface of the cabin roof provided at the upper part of the cabin frame has many curves and is also less rigid than the cabin frame. Accordingly, it is necessary to reinforce the mounting stay on which the GPS antenna is mounted without impairing the appearance of the cabin roof. Also, in this respect, the conventional technique has room for improvement.

In view of this situation, a main object of the present invention is to provide a work vehicle capable of efficiently mounting various types of antenna devices effective for autonomous traveling, and the like, of the work vehicle and securely supporting the various types of antenna devices.

Means for Solving the Problems

A first characteristic configuration according to the present invention is that, in a work vehicle with a cabin, a support frame extending in a lateral width direction is fixed to a cabin frame at an upper position outside the cabin, and an antenna unit in which an inertial measurement unit, a GNSS antenna, and a wireless communicator are built is attached to the support frame in a state where the inertial measurement unit and the GNSS antenna are placed at a substantially center position in a lateral width direction of a vehicle body, and the antenna unit is attached to the support frame to be displaceable from a normal use position, in which the antenna unit protrudes above the roof of the cabin, to a non-use position that is lower than the highest part of the roof.

With the above configuration, the inertial measurement unit and the GNSS antenna which are built in the antenna unit are placed at the substantially center position in the lateral width direction of the vehicle body, and thus, it is possible to improve both the detection accuracy of the current position information of the work vehicle acquired from a reception signal of the GNSS antenna and the detection accuracy of the posture change information of the vehicle body acquired from the inertial measurement unit.

Further, the wireless communicator built in the antenna unit enables a wireless communication of various types of signals, with an external device such as a wireless communication terminal.

In addition, the support frame on which the antenna unit is mounted is fixed to the rigid cabin frame in a posture along the lateral width direction at the upper position and outside of the cabin, and thus, the support frame can be configured as a strong support structure. Further, the cabin frame has a height close to that of the cabin roof, and thus, if a mounting position of the support frame is set to an upper side of the cabin frame, it is possible to easily place the antenna unit at a height position where each of the inertial measurement unit, the GNSS antenna, and the wireless communicator function properly.

Therefore, the adoption of the antenna unit in which the inertial measurement unit, the GNSS antenna, and the wireless communicator are built, the installation position of the inertial measurement unit and the GNSS antenna with respect to the vehicle body, and the above-described rational elaboration in the support structure of the antenna unit make it possible to improve both the detection accuracy of the inertial measurement unit and the detection accuracy of the GNSS antenna and make it possible to efficiently install the inertial measurement unit and the GNSS antenna in the work vehicle while a satisfactory communication of the wireless communicator is maintained. In addition, it is possible to configure a strong support structure of the installed antenna unit.

In a second characteristic configuration according to the present invention, the support frame is bridged to be coupled to mirror mounting parts provided on the left and right of the cabin frame.

According to the above configuration, the left and right mirror mounting parts are arranged to protrude from the rigid cabin frame, and are placed at a height position close to that of the cabin roof. Therefore, it is possible to firmly and easily mount the support frame of the antenna unit at an appropriate height position by utilizing the two mirror mounting parts that are sturdy and have adequate height above the ground.

In a third characteristic configuration according to the present invention, the antenna unit is attached to the support frame to be displaceable from a normal use position to a lower non-use position.

According to the above configuration, if the antenna unit is in the normal use position, for example, the antenna unit or an antenna mounted on the antenna unit may be placed to protrude above the upper surface of the cabin roof. Therefore, the height of a transport vehicle such as a truck to transport the work vehicle is high, and thus, there may be a problem that the vehicle is subject to height restrictions in traveling on a road or the like. Therefore, in the present invention, if the antenna unit is displaced from the normal use position to the lower non-use position with respect to the support frame, it is possible to easily cope with problems such as the height restrictions in traveling on a road.

In a fourth characteristic configuration according to the present invention, the work vehicle includes a control unit configured to perform autonomous traveling control of the vehicle body based on information acquired by the inertial measurement unit and the GNSS antenna, and an autonomous traveling restraint unit configured to restrict start of the autonomous traveling control by the control unit unless it is detected that the antenna unit is in the normal use position.

According to the above configuration, if it is detected that the antenna unit is in the normal use position, the autonomous traveling restraint unit is not activated, and the control unit starts autonomous traveling control based on information acquired by the inertial measurement unit and the GNSS antenna. If it is not detected that the antenna unit is in the normal use position, the restriction is activated by the autonomous traveling restraint unit and the start of the autonomous traveling control is restricted by the control unit. As a result, it is possible to accurately and safely perform autonomous traveling of the vehicle body along a target traveling route based on the accurate information acquired by the inertial measurement unit and the GNSS antenna while employing the position displacement structure of the antenna unit in accordance with height restrictions and the like in traveling on a road.

In a fifth characteristic configuration according to the present invention, a control unit configured to perform autonomous traveling control of the vehicle body based on information acquired by the inertial measurement unit and the GNSS antenna is provided in the cabin, and a harness led out from the antenna unit is arranged to reach the control unit in the cabin via an internal/external communication passage provided in the cabin frame.

According to the above configuration, the antenna unit placed at the upper position outside the cabin and the control unit provided in the cabin can be connected by a rational arrangement of the harness passing through the internal/external communication passage provided in the cabin frame.

In a sixth characteristic configuration according to the present invention, the harness led out from the antenna unit is arranged at one side edge in a lateral width direction on the outer surface of a windshield of the cabin, and along a band-shaped part overlapping with a glass receiving part of a front pillar of the cabin.

According to the above configuration, one side edge in the lateral width direction on the outer surface of the windshield and the band-shaped part overlapping the glass receiving part of the front pillar form a glass attaching part for attaching the windshield to the front part of the cabin, and are also in a position that does not interfere with viewing. Therefore, the harness led out from the antenna unit is placed in the above-described band-shaped part, and thus, it is possible to place the harness in a good appearance while maintaining good conditions for a visual field of an operator seated on the driver's seat.

DESCRIPTION OF EMBODIMENTS

Embodiments of the present invention will be described with reference to the drawings.

Figure 1:
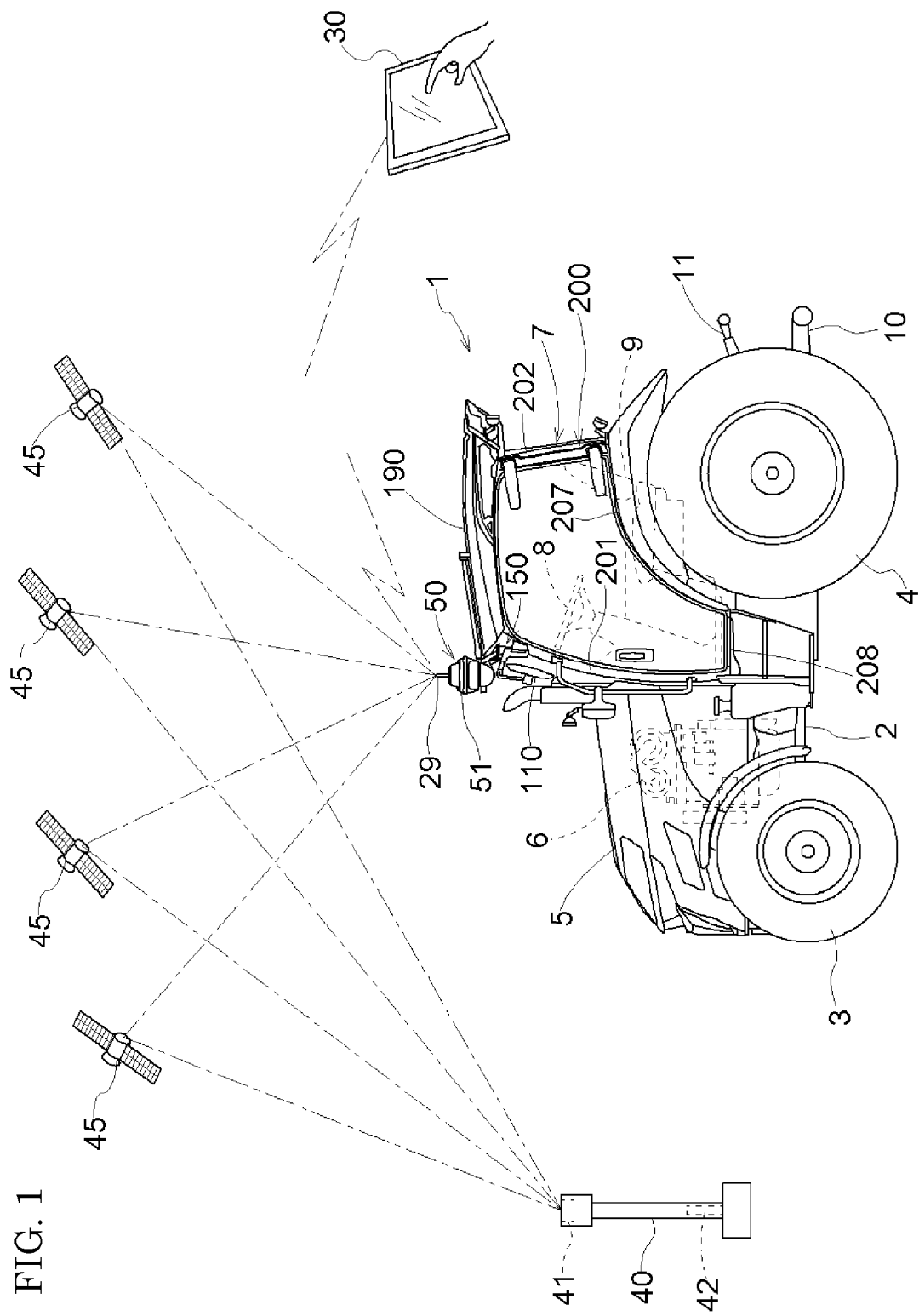
FIG. 1 is an overall side view of a tractor.
Figure 2:
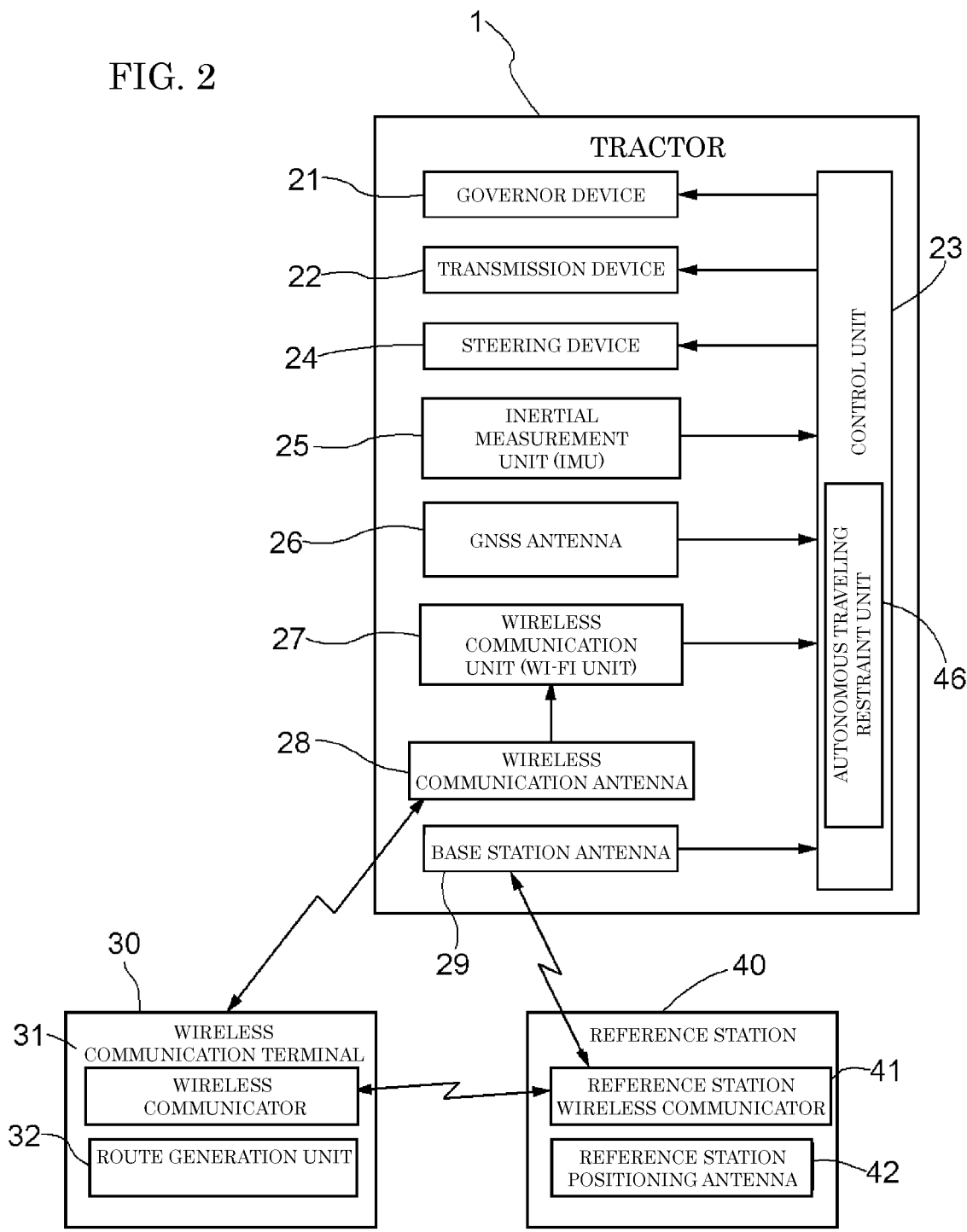
FIG. 2 is a block diagram of control of the tractor, a reference station, and a wireless communication terminal.

An autonomous traveling system illustrated in FIGS. 1 and 2 is configured to generate a target traveling route and enable a tractor 1 serving as a work vehicle to autonomously travel along the generated target traveling route. The autonomous traveling system includes, in addition to the tractor 1 capable of autonomous traveling, a wireless communication terminal 30 configured to issue various types of instructions to the tractor 1, and a reference station 40 configured to acquire position information of the tractor 1.

First, the tractor 1 will be described with reference to FIG. 1.

The tractor 1 includes a vehicle body 2 configured to mount a ground work machine (not illustrated) on the rear side, a front part of the vehicle body 2 is supported by a pair of left and right front wheels 3, and a rear part of the vehicle body 2 is supported by a pair of left and right rear wheels 4. A hood 5 is placed in the front part of the vehicle body 2, and an engine 6 serving as a drive source is housed inside the hood 5. A cabin 7 in which a driver rides is provided behind the hood 5, and a steering handle 8 with which the driver performs a steering operation, a driver's seat 9 for the driver, and the like are provided in the cabin 7.

The engine 6 can include, for example, a diesel engine, but is not limited to this, and may include, for example, a gasoline engine. Further, an electric motor may be employed as a drive source in addition to or instead of the engine 6.

Further, in the present embodiment, the tractor 1 will be described as a work vehicle by way of example, but examples of the work vehicle include, in addition to a tractor, riding type of work vehicles such as a rice transplanter, a combine, a civil engineering/construction work device, and a snowplow.

A three-point link mechanism including a pair of left and right lower links 10 and an upper link 11 is provided on the rear side of the vehicle body 2 so that a ground work machine is mountable on the three-point link mechanism. Although not illustrated, a lifting device including a hydraulic device such as a lifting cylinder is provided on the rear side of the vehicle body 2, and the lifting device raises and lowers the three-point link mechanism to raise and lower the ground work machine.

Examples of the ground work machine include a tilling device, a plow, and a fertilizing device.

As illustrated in FIG. 2, the tractor 1 includes a governor device 21 configured to adjust the rotation speed of the engine 6, a transmission device 22 configured to change a rotational driving force from the engine 6 and transmit the rotational driving force to driving wheels, a control unit 23 configured to control the governor device 21 and the transmission device 22, and the like. The transmission device 22 is configured of, for example, a combination of a main transmission device including a hydraulic continuously variable transmission device and an auxiliary transmission device including a gear-type multi-stage transmission device.

The tractor 1 is configured not only to travel with a driver riding in the cabin 7, but also to autonomously travel based on, for example, an instruction from the wireless communication terminal 30 even without a driver riding in the cabin 7.

As illustrated in FIG. 2, the tractor 1 includes a steering device 24, an inertial measurement unit (IMU) 25 configured to obtain posture change information of the vehicle body, a GNSS antenna 26 configured to receive a wireless signal transmitted from a positioning satellite (navigation satellite) 45 included in a Global Navigation Satellite System (GNSS), a wireless communication unit (an example of a wireless communicator built in an antenna unit 50) 27 configured to transmit and receive various types of signals via a wireless communication network established between the wireless communication unit 27 and the wireless communication terminal 30 or the like, a base station antenna (an example of a wireless communicator built in the antenna unit 50) 29 configured to receive a wireless signal (for example, a wireless signal with a frequency band of 920 MHz) from a reference station wireless communicator 41 of the reference station 40, and the like. As a result, the tractor 1 is configured to autonomously travel while acquiring its own current position information (position information of the vehicle body 2).

Figure 3:
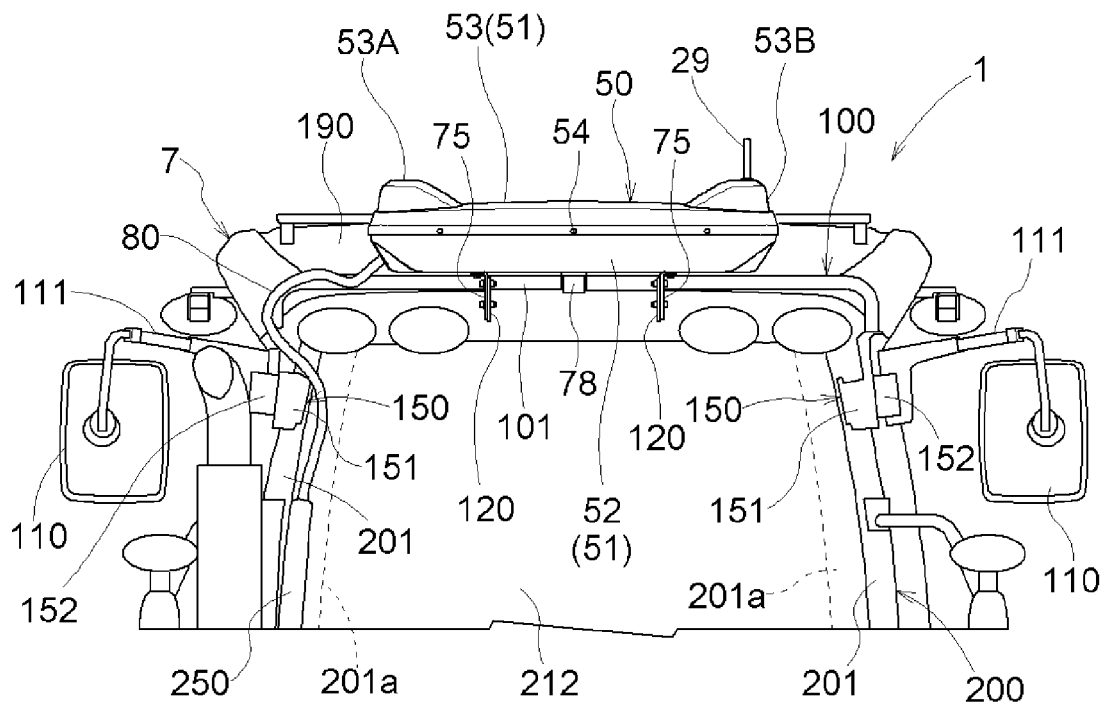
FIG. 3 is a front view of an antenna unit mounting part of the tractor.
Figure 4:
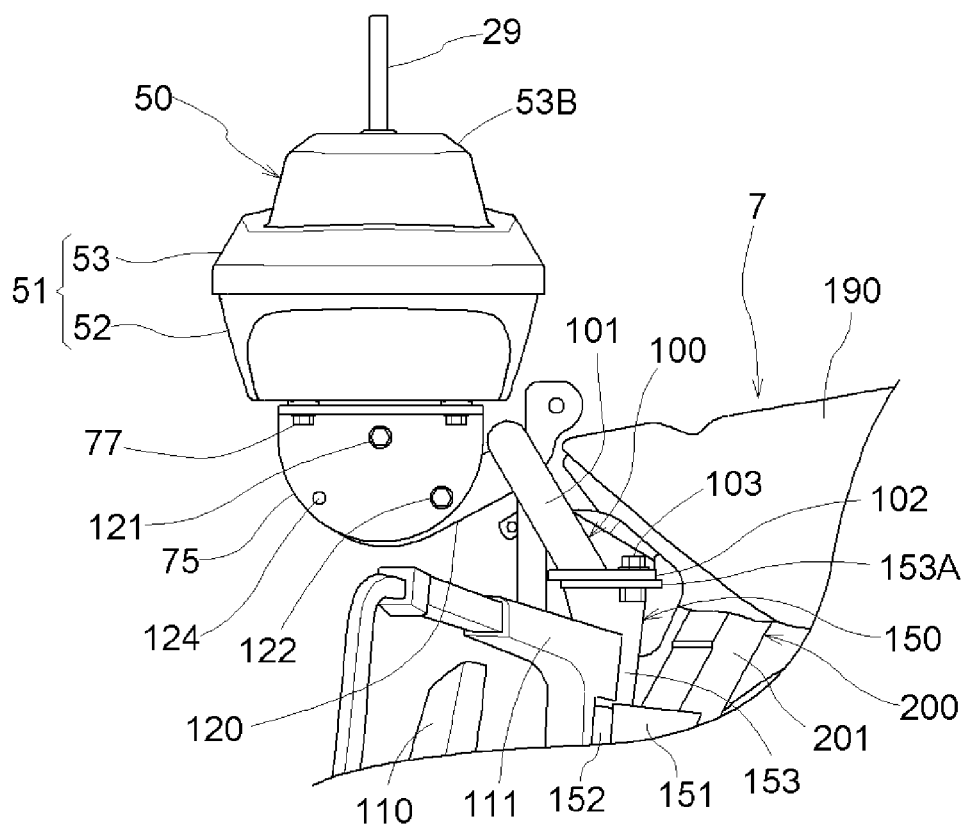
FIG. 4 is a side view of the antenna unit mounting part of the tractor.
Figure 5:
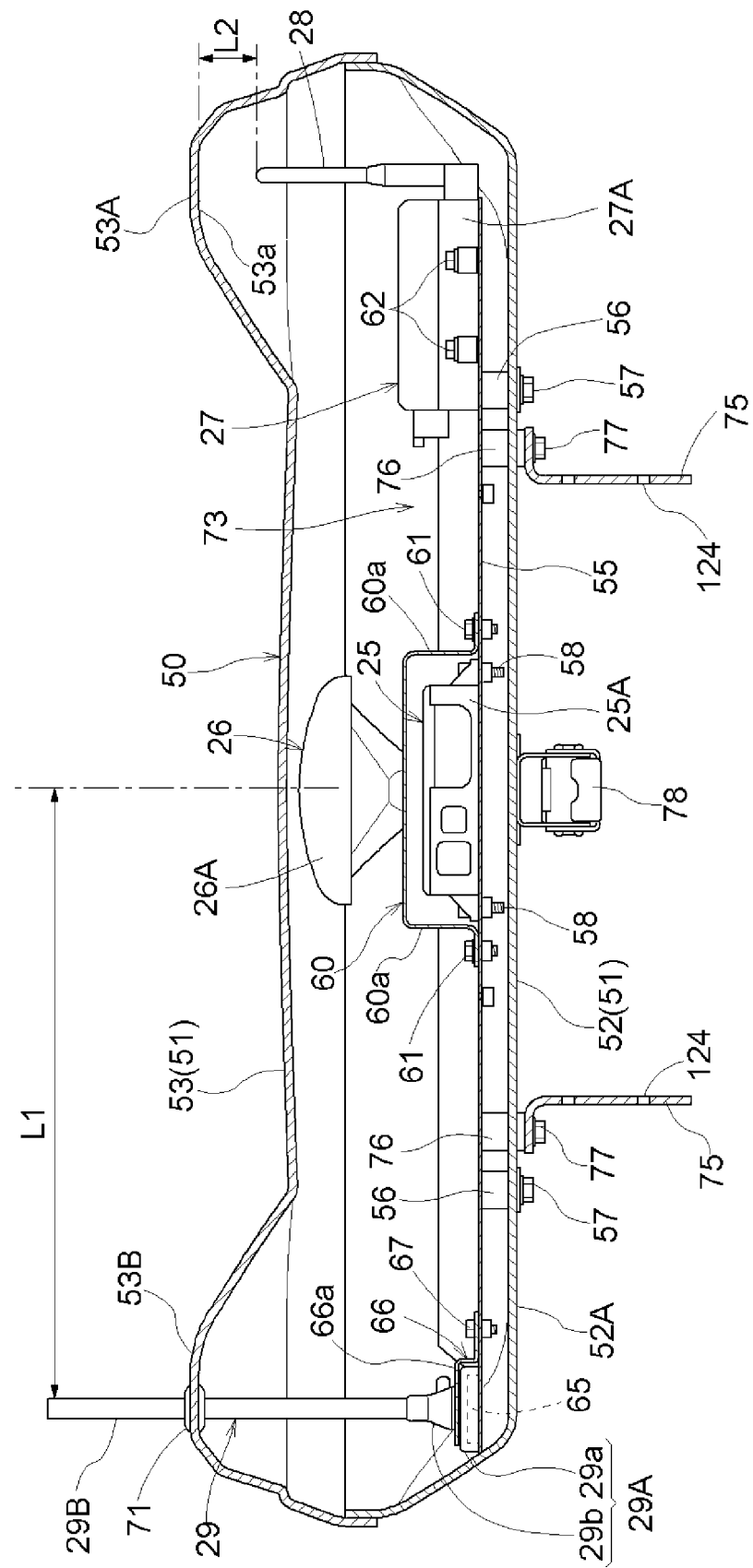
FIG. 5 is a longitudinal sectional view of an antenna unit.
Figure 6:
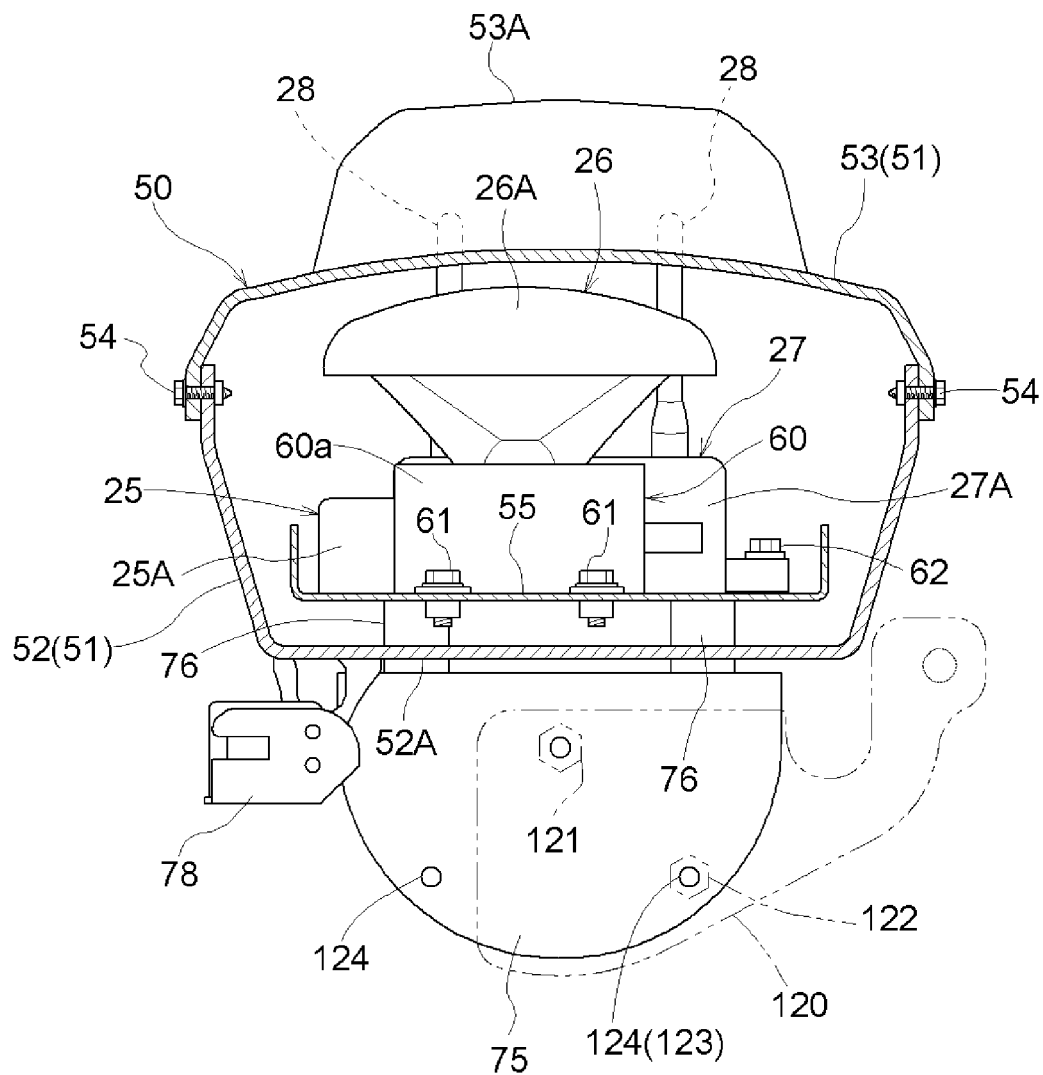
FIG. 6 is a cross-sectional view of the antenna unit.
Figure 7:
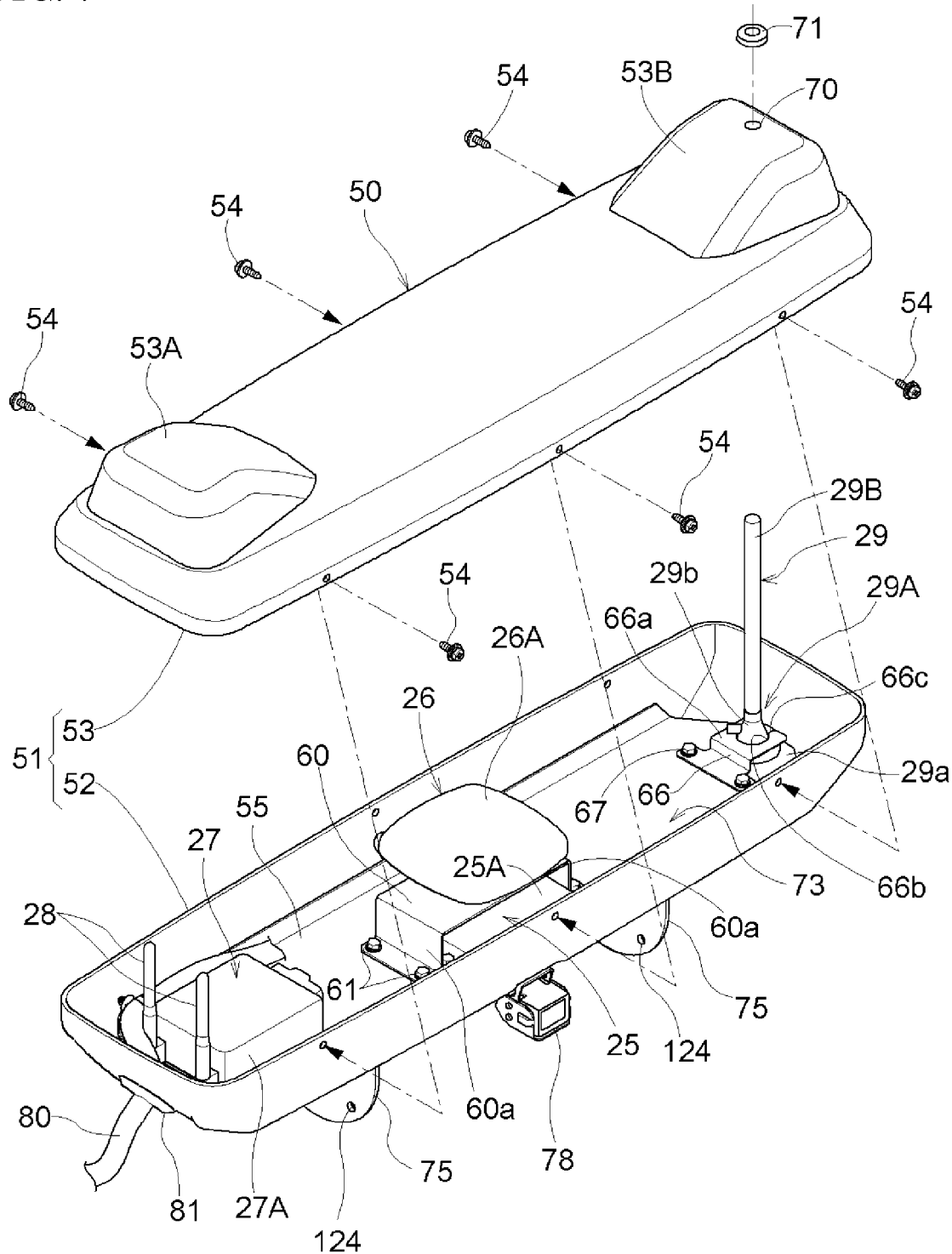
FIG. 7 is an exploded perspective view of the antenna unit.

The inertial measurement unit 25, the GNSS antenna 26, the wireless communication unit 27, and the base station antenna 29 are housed in the antenna unit 50 including a unit cover 51 as illustrated in FIGS. 5 to 7. As illustrated in FIGS. 3 and 4, the antenna unit 50 is mounted on a support frame 100, which is fixed to a cabin frame 200 of the cabin 7 and arranged along the lateral width direction, at an upper position on the front side outside the cabin 7.

It is noted that a specific internal arrangement structure and mounting structure of the antenna unit 50 will be described in detail after the description of the autonomous traveling system.

The steering device 24 is provided, for example, in the middle of the rotation shaft of the steering handle 8 and is configured to adjust the rotation angle (steering angle) of the steering handle 8. The control unit 23 controls the steering device 24 to adjust the rotation angle of the steering handle 8 to a desired rotation angle so that the tractor 1 not only travels straight but also turns with a desired turning radius.

The inertial measurement unit 25 obtains a three-dimensional angular velocity and acceleration with a three-axial gyro and a three-directional accelerometer. A detection value of the inertial measurement unit 25 is input to the control unit 23, and the control unit 23 operates the value by using a posture and azimuth operation means to obtain posture information (an azimuth angle (yaw angle) of the vehicle body, a tilt angle in the lateral direction (roll angle) of the vehicle body, and a tilt angle in the front-rear moving direction (pitch angle) of the vehicle body) of the tractor 1.

In the Global Navigation Satellite System (GNSS), a satellite positioning system such as a quasi-zenith satellite (Japan) or a GLONASS satellite (Russia) in addition to the Global Positioning System (GPS), (USA), may also be employed for the positioning satellite.

In the present embodiment, the wireless communication unit 27 includes a Wi-Fi unit with a frequency band of 2.4 GHz, but the wireless communication unit 27 may include Bluetooth (registered trademark) or the like instead of Wi-Fi. As illustrated in FIG. 2, a signal received by a wireless communication antenna 28 of the wireless communication unit 27 may be input to the control unit 23, and the signal from the control unit 23 is configured to be transmitted by the wireless communication antenna 28 to a wireless communicator 31 of the wireless communication terminal 30 or the like.

Here, for a positioning method using the satellite positioning system, a positioning method is applicable, in which the reference station 40 installed at a predetermined reference point is provided, and satellite positioning information of the tractor 1 (mobile station) is corrected by correction information from the reference station 40 to obtain a current position of the tractor 1. For example, various types of positioning methods such as a differential GPS positioning (DGPS) and a real-time kinematic positioning (RTK positioning) are applicable.

In the present embodiment, for example, the RTK positioning is applied. As illustrated in FIGS. 1 and 2, the GNSS antenna 26 is provided in the tractor 1, being the mobile station, and additionally the reference station 40 including a reference station positioning antenna 42 is provided. The reference station 40 is placed at a position (reference point) where the traveling of the tractor 1 is not hindered, such as an area around a farm field. Position information of the reference point, being an installation position of the reference station 40, is obtained in advance. The reference station 40 includes the reference station wireless communicator 41 configured to transmit and receive various types of signals to and from the base station antenna 29 of the tractor 1. As a result, the reference station 40 is configured to transmit and receive a variety of information between the reference station 40 and the tractor 1 and between the reference station 40 and the wireless communication terminal 30.

In the RTK positioning, both the reference station positioning antenna 42 of the reference station 40 installed at the reference point and the GNSS antenna 26 of the tractor 1, being the mobile station side whose position information is to be obtained, measure a carrier phase (satellite positioning information) from the positioning satellite 45. The reference station 40 generates correction information including the measured satellite positioning information and the position information of the reference point each time the satellite positioning information is measured from the positioning satellite 45 or each time a set period elapses, and transmits the correction information from the reference station wireless communicator 41 to the base station antenna 29 of the tractor 1. The control unit 23 of the tractor 1 corrects the satellite positioning information measured by the GNSS antenna 26 by using the correction information transmitted from the reference station 40 to obtain the current position information of the tractor 1. The control unit 23 obtains, for example, latitude information and longitude information as the current position information of the tractor 1.

The autonomous traveling system includes, in addition to the tractor 1 and the reference station 40, the wireless communication terminal 30 configured to issue an instruction to cause the tractor 1 to autonomously travel, to the control unit 23 of the tractor 1. The wireless communication terminal 30 includes, for example, a tablet-type personal computer having a touch panel, and is configured to display a variety of information on the touch panel, and also to receive an input of a variety of information through an operation on the touch panel. The wireless communication terminal 30 includes the wireless communicator 31 and a route generation unit 32 configured to generate a target traveling route. The route generation unit 32 generates a target traveling route where the tractor 1 autonomously travels based on a variety of information input through the touch panel.

The control unit 23 included in the tractor 1 is configured to transmit and receive a variety of information to and from the wireless communication terminal 30 via a wireless communication network established with the wireless communicator 31 or the like. The wireless communication terminal 30 is configured to issue an instruction for autonomous traveling to the tractor 1 by transmitting a variety of information for causing the tractor 1 to autonomously travel, such as the target traveling route, to the control unit 23 of the tractor 1. The control unit 23 of the tractor 1 is configured to obtain the current position information of the tractor 1 acquired from a reception signal of the GNSS antenna 26 so that the tractor 1 autonomously travels along the target traveling route generated by the route generation unit 32, to obtain displacement information and azimuth information of the vehicle body from the inertial measurement unit 25, and to control the transmission device 22, the steering device 24, and the like based on the current position information, the displacement information, and the azimuth information.

Next, an internal arrangement structure of the antenna unit 50 will be described.

As illustrated in FIGS. 5 to 9, the unit cover 51 of the antenna unit 50 includes a lower cover body 52 which is made of resin and has a substantially rectangular shape in a plan view, the upper side of which is opened, and an upper cover body 53 which is made of resin and has a substantially rectangular shape in a plan view, the lower side of which is opened. Here, FIG. 5 illustrates a longitudinal sectional view of the antenna unit 50 when viewed from the rear side, and the lateral direction in the vehicle body 2 is opposite to that of FIGS. 3, 7, and 8. An opening joint part of the upper cover body 53 externally fits onto and detachably joins to an opening joint part of the lower cover body 52 in a watertight manner. The opening joint part of the upper cover body 53 and the opening joint part of the lower cover body 52 are fixedly coupled by screws 54 in a plurality of places in the lateral direction on the front side and the rear side.

As illustrated in FIGS. 5 to 7, a base plate 55 made of metal, which is an example of a unit base configured to be mounted on the tractor 1, is mounted on a bottom plate part 52A of the lower cover body 52. As illustrated in FIG. 5, a plurality of (four in the present embodiment) cylindrical first bosses 56 for maintaining an interval between the base plate 55 and the bottom plate part 52A of the lower cover body 52 at a set interval are arranged between the base plate 55 and the bottom plate part 52A of the lower cover body 52, and a first bolt 57 is inserted into each of the first bosses 56 to fixedly couple the base plate 55 and the bottom plate part 52A of the lower cover body 52.

As illustrated in FIGS. 5 to 7, at the center in the longitudinal direction of the base plate 55, the inertial measurement unit 25 and the GNSS antenna 26, which are placed at the center position or substantially the center position in the lateral width direction of the vehicle body, are provided in a state where the inertial measurement unit 25 and the GNSS antenna 26 overlap with each other vertically. Between these, the GNSS antenna 26 is the one placed above the inertial measurement unit 25.

Specifically, a housing 25A of the inertial measurement unit 25 is fixedly coupled to the base plate 55 by second bolts 58 in a state where the center position in the lateral direction of the housing 25A is located at the center position in the longitudinal direction of the base plate 55.

On the other hand, as illustrated in FIGS. 5 to 7, a housing 26A of the GNSS antenna 26 is mounted on the base plate 55 via a metal hat-shaped bracket 60 in a state where the center position in the lateral direction of the housing 26A is located at the center position in the longitudinal direction of the base plate 55. The bracket 60 is formed in a hat shape detouring above the housing 25A of the inertial measurement unit 25 along the longitudinal direction of the base plate 55. Both leg parts 60a of the hat-shaped bracket 60 are fixedly coupled to the base plate 55 by third bolts 61, the width of the hat-shaped bracket 60 in the front-rear direction (also the front-rear direction of the vehicle body) is set to be slightly smaller than the width of the housing 25A of the inertial measurement unit 25 in the front-rear direction, and a part of the bracket 60 is configured as a shielding wall that provides shielding between the bracket 60 and the wireless communication unit 27 described later.

With the arrangement of the inertial measurement unit 25 and the GNSS antenna 26 described above, the inertial measurement unit 25 and the GNSS antenna 26 are placed vertically at the center position or substantially the center position in the lateral width direction of the vehicle body in a mounting state on the tractor 1 as illustrated in FIG. 3. Accordingly, it is possible to improve both the detection accuracy of the current position information of the tractor 1 acquired from the reception signal of the GNSS antenna 26 and the detection accuracy of the displacement information and the azimuth information of the vehicle body acquired from the inertial measurement unit 25. In addition, the width of the unit cover 51 in the front-rear direction is reduced, and thus, the antenna unit 50 can be formed in a compact shape.

Further, with the arrangement described above, as illustrated in FIGS. 5 and 6, only the upper cover body 53 made of resin is present above the GNSS antenna 26, and thus, for example, unlike a case where the inertial measurement unit 25 is placed above the GNSS antenna 26, the inertial measurement unit 25 is not a hindrance for reception at the GNSS antenna 26, and a carrier phase (satellite positioning information) from the positioning satellite 45 can be reliably received.

As illustrated in FIGS. 5 and 7, a housing 27A of the wireless communication unit (an example of a wireless communicator built in the antenna unit 50) 27 including a pair of wireless communication antennas 28 in the front-rear direction is fixedly coupled by fourth bolts 62 to one end in the longitudinal direction of the base plate 55 (the right end in the lateral direction of the vehicle body 2 with respect to the forward direction, the right end in FIG. 5, the left end in FIG. 7). The wireless communication antenna 28 of the wireless communication unit 27 is placed on the side opposite to the inertial measurement unit 25 and the GNSS antenna 26, and on one end in the longitudinal direction of the base plate 55.

As illustrated in FIG. 5, a first predetermined distance L1 between the wireless communication antenna 28 of the wireless communication unit 27 and the central part of the inertial measurement unit 25 is set to 250 mm or more.

If the installation position and orientation of the above-described wireless communication unit 27 is elaborated, the first predetermined distance L1 from the wireless communication antenna 28 of the wireless communication unit 27 to the central part of the inertial measurement unit 25 can be sufficiently secured while the antenna unit 50 can be made compact in the longitudinal direction. As a result, it is possible to suppress radio interference between the wireless communication unit 27 and the inertial measurement unit 25 to prevent communication failure between the wireless communication unit 27 and the wireless communicator 31 of the wireless communication terminal 30.

In particular, as described above, if the first predetermined distance L1 between the wireless communication antenna 28 of the wireless communication unit 27 and the central part of the inertial measurement unit 25 is set to 250 mm or more, the radio interference between the wireless communication unit 27 and the inertial measurement unit 25 can be suppressed more effectively.

Further, the outer periphery of the inertial measurement unit 25 is shielded by the metal housing 25A at many portions except for at connectors and the like, and a part of the metal hat-shaped bracket 60 located between the wireless communication unit 27 and the inertial measurement unit 25 functions as a shielding wall. Accordingly, radio interference between the wireless communication unit 27 and the inertial measurement unit 25 can be suppressed even more.

As illustrated in FIGS. 5 and 7, the base station antenna (an example of a wireless communicator built in the antenna unit 50) 29 configured to receive information from the reference station 40 is placed at the other end in the longitudinal direction of the base plate 55 (the left end in the lateral direction of the vehicle body 2 with respect to the forward direction, the left end in FIG. 5, the right end in FIG. 7). As a result, the wireless communication unit 27, the GNSS antenna 26 (the inertial measurement unit 25), and the base station antenna 29 are placed on the base plate 55 in this order from the right in the lateral direction of the vehicle body 2 with respect to the forward direction to be arranged in a line in the lateral direction of the vehicle body 2. As illustrated in FIG. 5, the base station antenna 29 includes a base 29A including a magnet 65 and a round bar-shaped antenna bar 29B extending upward from the base 29A. Further, the base 29A includes a cylindrical lower base body 29a containing the magnet 65, and a frustoconical upper base body 29b integrally formed with a central part of the upper surface of the lower base body 29a. Therefore, the base station antenna 29 is mounted on the metal base plate 55 by the magnetic force of the magnet 65.

Further, as illustrated in FIGS. 5 and 7, a sheet metal movement restricting member 66 is fixedly coupled to the base plate 55 by fifth bolts 67. The movement restricting member 66 is configured to restrict the movement of the base 29A of the base station antenna 29 by contacting or approaching, from above, a vertical middle position of the conical outer peripheral surface of the upper base body 29b in the base 29A of the base station antenna 29. As illustrated in FIG. 7, in an upper restricting plate piece 66a formed, in the movement restricting member 66, by bending the movement restricting member 66, a circular movement restricting hole 66b onto which the upper base body 29b of the base 29A fits, and a detachment notch 66c having a width dimension that allows for passage of the antenna bar 29B are continuously formed.

In the above arrangement of the base station antenna 29, a separation distance between the antenna bar 29B of the base station antenna 29 and the wireless communication antenna 28 of the wireless communication unit 27 is large. Accordingly, it is possible to suppress radio interference between the antenna bar 29B of the base station antenna 29 and the wireless communication antenna 28 of the wireless communication unit 27.

In addition, it is possible to easily mount the base station antenna 29 on the base plate 55 made of metal by the magnetic force of the magnet 65 provided in the base 29A. Moreover, a displacement of the base station antenna 29 due to vibration or the like can be reliably prevented by the movement restricting member 66 having a simple shape being fixed to the base plate 55 by bolts. The antenna unit 50 can be made compact by simplifying and downsizing the mounting structure of the base station antenna 29.

Next, the unit cover 51 of the antenna unit 50 will be described.

As illustrated in FIGS. 5 to 7, a first bulge part 53A protruding upward from the upper surface position at the center in the longitudinal direction of the upper cover body 53 and the upper end position of the wireless communication antenna 28 of the wireless communication unit 27 is formed at one end in the longitudinal direction (the right side in the lateral direction of the vehicle body 2 with respect to the forward direction) of the upper cover body 53 of the unit cover 51. Further, as illustrated in FIG. 5, a second predetermined distance L2 between an inner surface 53a of the first bulge part 53A and the upper end of the wireless communication antenna 28 is set to 30 mm or more.

With the second predetermined distance L2 formed between the upper end of the wireless communication antenna 28 and the inner surface 53a of the first bulge part 53A of the upper cover body 53, it is possible to improve the communication accuracy between the wireless communication unit 27 and the wireless communicator 31 of the wireless communication terminal 30.

It is noted that the relationship between the first predetermined distance L1 and the second predetermined distance L2 is set to first predetermined distance L1>second predetermined distance L2.

Figure 8:
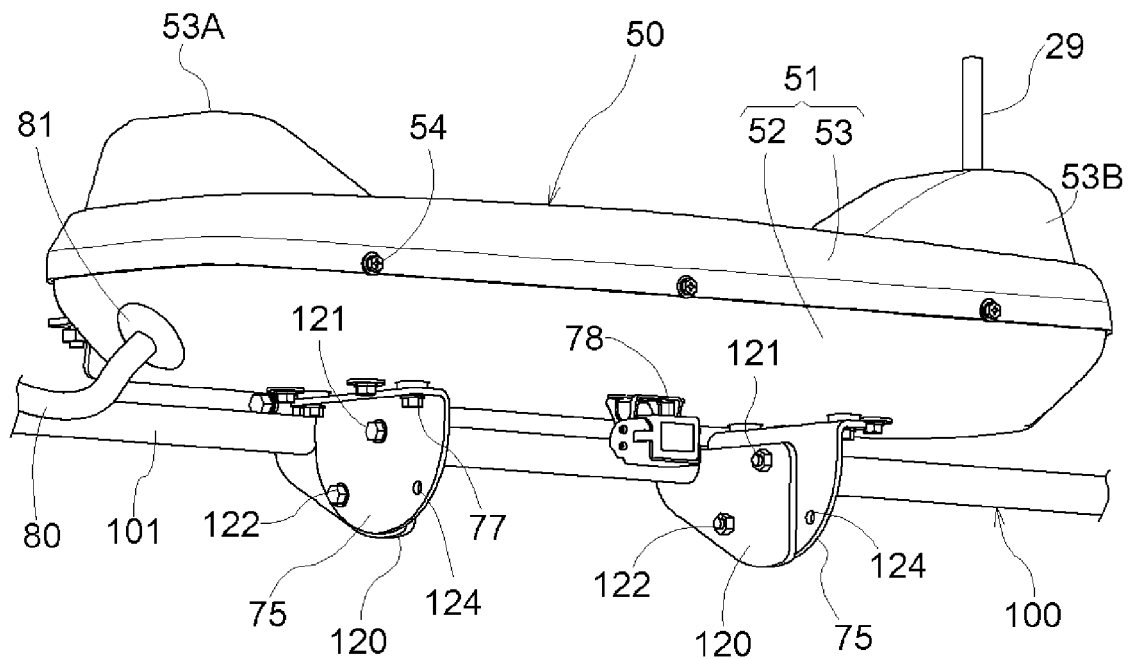
FIG. 8 is a perspective view of the antenna unit mounting part at an elevation angle.

Further, as illustrated in FIGS. 5, 7, and 8, a second bulge part 53B, having the same shape as the first bulge part 53A formed at one end in the longitudinal direction (the right side in the lateral direction of the vehicle body 2 with respect to the forward direction) is formed on the other end in the longitudinal direction of the upper cover body 53 of the unit cover 51 (the left side in the lateral direction of the vehicle body 2 with respect to the forward direction), and thus, the unit cover 51 is formed in a laterally symmetrical shape. This configuration is made in consideration of the design when the antenna unit 50 is mounted in the upper position on the front side of the cabin 7 of the tractor 1, but the formation of the second bulge part 53B also creates a new technical value.

That is, as illustrated in FIGS. 5 and 7, the second bulge part 53B of the upper cover body 53 is formed at a portion corresponding to the base station antenna 29, and the total height of the base station antenna 29 is sufficiently larger than the height from the upper surface of the base plate 55 to the upper surface of the second bulge part 53B. Therefore, as illustrated in FIG. 7, a through hole 70 through which the antenna bar 29B of the base station antenna 29 penetrates to protrude outward and upward is formed on the upper surface of the second bulge part 53B. A vibration-proof elastic body 71, such as a tubular rubber piece contacting an outer peripheral surface of the penetrating portion of the antenna bar 29B of the base station antenna 29, is attached to the periphery of the opening of the through hole 70. A grommet which contacts the entire circumference of the antenna bar 29B and also exhibits water tightness is employed for the vibration-proof elastic body 71.

If the vibration-proof elastic body 71 is not provided, an annular gap is present between the periphery of the opening of the through hole 70 of the second bulge part 53B and the outer peripheral surface of the penetrating portion of the antenna bar 29B. If traveling vibration of the tractor 1 or the like acts on the base station antenna 29, the antenna bar 29B swings within the range of the annular gap, which may result in breakage of the antenna bar 29B at the root. However, in the present embodiment, as described above, since a vertical middle part of the antenna bar 29B is supported by the vibration-proof elastic body 71 provided in the periphery of the opening of the through hole 70 of the second bulge part 53B so that the support structure of the base station antenna 29 is a two-point support structure as a whole, it is possible to prevent the antenna bar 29B from breaking due to traveling vibration or the like.

In particular, if the second bulge part 53B is provided, the support position of the antenna bar 29B supported by the vibration-proof elastic body 71 is higher as it is higher from the upper surface of the base plate 55 to the upper surface of the second bulge part 53B, and thus, breakage of the antenna bar 29B can be further suppressed.

It is noted that, in the present embodiment, the vibration-proof elastic body 71 is attached in the periphery of the opening of the through hole 70 of the second bulge part 53B, however, the vibration-proof elastic body 71 may be mounted on the upper surface or the inner surface of the second bulge part 53B, or further, may be mounted on a bracket or the like provided in the base plate 55.

As illustrated in FIGS. 5 and 7, a mounting space 73 for another unit is formed in the longitudinal direction of the base plate 55 between the base station antenna 29 and both the inertial measurement unit 25 and the GNSS antenna 26. Here, FIGS. 5 and 7 illustrate a state where another unit 72 is not mounted in the mounting space 73 and the mounting space 73 is a vacant space.

The other unit may be, for example, a controller for a retrofit liquid crystal monitor configured to govern a part of the autonomous traveling control, or the like. In the tractor 1 following the autonomous traveling specification according to the present embodiment, a liquid crystal monitor 47 (see FIG. 13) is provided in the cabin 7, and the liquid crystal monitor 47 is equipped with a controller configured to govern a part of the autonomous traveling control. However, if another work vehicle such as a rice transplanter following a normal specification is changed to follow the autonomous traveling specification, a controller for a retrofit liquid crystal monitor configured to govern the autonomous traveling control is required. In this case, the controller can be easily mounted by using the mounting space 73 secured in the base plate 55.

It is noted that, in the present embodiment, a tablet terminal 48 in which a dedicated application for performing route generation, farm field registration, and the like is installed, is used as the liquid crystal monitor 47.

Further, as illustrated in FIGS. 5 and 6, stays 75 bent to be formed in an inverted "L" shape (see FIG. 5) in a front view of the vehicle body and formed in a substantially semi-circular shape (see FIG. 6) in a side view of the vehicle body are provided at both side portions in the longitudinal direction on the lower surface of the bottom plate part 52A of the lower cover body 52. The pair of left and right stays 75 are fixedly coupled to the base plate 55 by sixth bolts 77 via second bosses 76 penetrating the bottom plate part 52A of the lower cover body 52.

Further, as illustrated in FIGS. 5 to 7, a camera 78 for capturing an image of the front of the vehicle body is mounted at the center position in the longitudinal direction on the lower surface of the bottom plate part 52A of the lower cover body 52, and an image captured by the camera 78 can be displayed on the touch panel of the wireless communication terminal 30 via wireless communication between the wireless communication unit 27 of the tractor 1 and the wireless communicator 31 of the wireless communication terminal 30.

It is noted that, in FIGS. 5 to 7, wires connected to the inertial measurement unit 25, the GNSS antenna 26, the wireless communication unit 27, and the base station antenna 29 which are built on the base plate 55 are omitted. FIG. 7 illustrates a part of one harness 80 in which the wires are assembled in the unit cover 51. As illustrated in FIG. 7, the harness 80 is led out from a harness lead-out hole (not illustrated) formed at one end in the longitudinal direction of the lower cover body 52. A grommet 81 is mounted on the harness lead-out hole.

Next, a mounting structure of the antenna unit 50 will be described.

As illustrated in FIGS. 3 and 4, both ends of the support frame 100 of the antenna unit 50 are fixedly coupled to mirror mounting parts 150 provided on left and right front pillars 201 constituting the cabin frame 200.

As illustrated in FIGS. 3 and 4, in each of the left and right mirror mounting parts 150, a mounting base 151 substantially formed in a "C" shape ("U" shape) in a plan view is fixed to the upper part of each of the front pillars 201 by welding or the like, and a plate-shaped mirror mounting member 153 including a hinge 152 for rotatably supporting a support arm 111 of a rearview mirror 110 is fixedly coupled to the mounting base 151 by a bolt or the like. A mounting piece 153A including an upper mounting surface along a horizontal plane is bent and formed at the upper ends of the left and right mirror mounting members 153.

As illustrated in FIGS. 3 and 4, the support frame 100 includes a pipe-shaped support member 101, having a circular cross section, formed by bending both ends in the lateral width direction downward in a substantially inverted U-shape in a front view of the vehicle body, and mounting plates 102, each including a lower mounting surface along a horizontal plane, are fixed to both ends of the pipe-shaped support member 101. Both the mounting plates 102 of the support frame 100 are fixedly coupled to the upper mounting surfaces of the mounting pieces 153A of the left and right mirror mounting members 153 by bolts 103 or the like.

As described above, the left and right mirror mounting parts 150 are mounted on the upper part of the front pillars 201 of the rigid cabin frame 200, and are placed at a height position close to the roof 190 of the cabin 7. Therefore, it is possible to firmly mount the support frame 100 of the antenna unit 50 at an appropriate height position by utilizing both of the mirror mounting parts 150 that are sturdy and have adequate height above the ground.

In addition, the upper mounting surfaces of the mounting pieces 153A in the left and right mirror mounting members 153 and the lower mounting surfaces of the two mounting plates 102 of the support frame 100 are all formed as horizontal surfaces, and thus, the middle part of the pipe-shaped support member 101 can be easily placed along the horizontal direction, which makes it possible to reduce error in mounting of the antenna unit 50 mounted on the horizontal middle part of the pipe-shaped support member 101.

As illustrated in FIGS. 3 and 4, in a state where the support frame 100 is laid across the left and right mirror mounting parts 150, the horizontal middle part of the pipe-shaped support member 101 of the support frame 100 is horizontally placed along the lateral width direction of the vehicle body at a position near the front end of the roof 190 of the cabin frame 200.

As illustrated in FIGS. 3, 4, and 6, a pair of left and right brackets 120 configured to support the pair of left and right stays 75 of the antenna unit 50 are fixed to the horizontal middle part of the pipe-shaped support member 101. The two sets of stays 75 on the side of the antenna unit 50 and the brackets 120 on the side of the support frame 100, which closely face each other in the lateral width direction of the vehicle body, and are pivotally coupled by a seventh bolt 121 serving as a horizontal pivot support shaft along the lateral width direction of the vehicle body.

Figure 9:
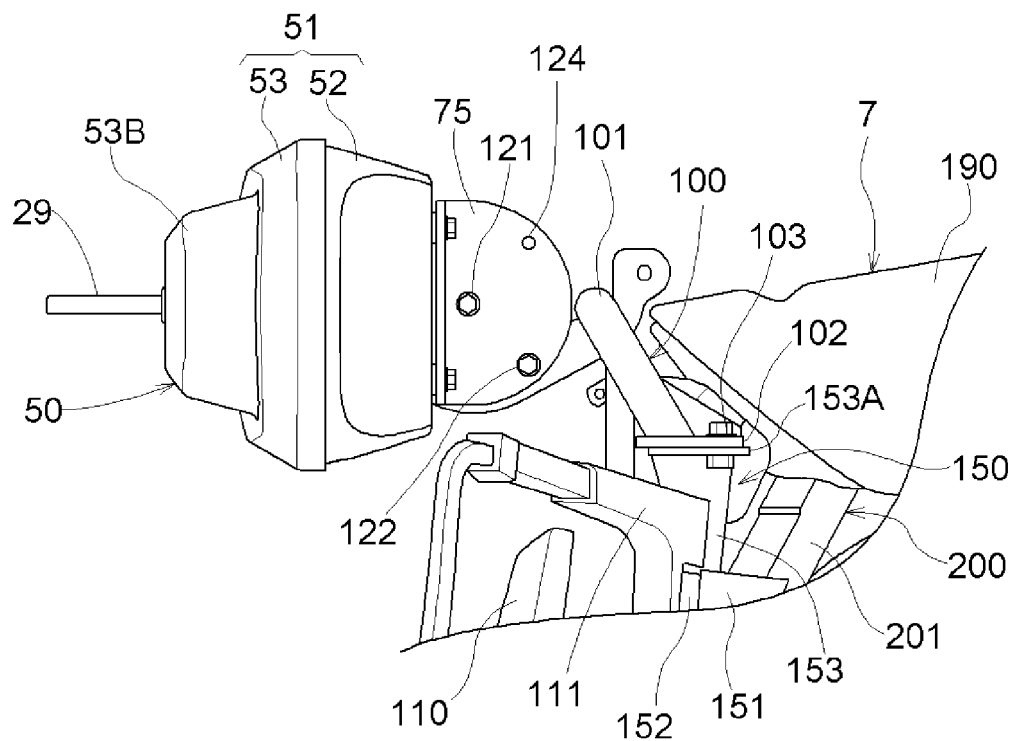
FIG. 9 is a side view of the antenna unit which is changed to a non-use position.

Therefore, due to the pivoting movement of the antenna unit 50 with respect to the support frame 100 around the pivot support shaft of the seventh bolt 121, the antenna unit 50 is displaceable between a normal use position (normal use posture) in which the base station antenna 29 protrudes upward in the vertical direction, as illustrated in FIGS. 3 and 4, and a non-use position (non-use posture) in which the base station antenna 29 is placed forward at a lower position, as illustrated in FIG. 9.

In the present embodiment, the non-use position of the antenna unit 50 is a position obtained when the antenna unit 50 pivots by 90 degrees forward from the normal use position, and in this non-use position, the base station antenna 29 is in a posture of projecting forward in the horizontal direction.

Further, in the present embodiment, an operation of changing the position of the antenna unit 50 between the normal use position and the non-use position is performed manually, but the operation of changing the position of the antenna unit 50 may be performed by a drive unit such as an actuator.

As illustrated in FIGS. 4 and 6, the two sets of stays 75 on the side of the antenna unit 50 and the brackets 120 on the side of the support frame 100 are capable of fixing the antenna unit 50 alternately in the normal use position or the non-use position by a replacement of an eighth bolt 122 provided at a position offset from the seventh bolt 121 in a pivoting radial direction.

More specifically, as illustrated in FIG. 6, one bolt insertion hole 123, through which the eighth bolt 122 is inserted, is formed in each of the brackets 120 on the side of the support frame 100, and bolt insertion holes 124 are formed in the stays 75 on the side of the antenna unit 50 at two positions coinciding with the bolt insertion hole 123 on the side of the brackets 120 when the antenna unit 50 is in the normal use position or the non-use position.

As illustrated in FIG. 4, if the antenna unit 50 is in the normal use position, the base station antenna 29 is in a posture in which the base station antenna 29 is directed upward in the vertical direction, and the upper end of the base station antenna 29 protrudes upward from the roof 190 of the cabin 7, as illustrated in FIG. 1. However, if the base station antenna 29 protruding upward from the roof 190 of the cabin 7 is a hindrance during transportation of the tractor 1 or the like, the position of the antenna unit 50 is changed from the normal use position to the non-use position, as illustrated in FIG. 9. In the non-use position, the base station antenna 29 is in a posture of protruding forward in the horizontal direction, and thus, the upward protruding height of the antenna unit 50 including the unit cover 51 can be made lower than the highest part of the roof 190 of the cabin 7.

Whether the antenna unit 50 is in the normal use position can be detected based on displacement information acquired from the inertial measurement unit 25. Accordingly, as illustrated in FIG. 2, the control unit 23 includes an autonomous traveling restraint unit 46 configured to prohibit the start of the autonomous traveling control based on information acquired by the inertial measurement unit 25 and the GNSS antenna 26 unless it is detected that the antenna unit 50 is in the normal use position.

The above-described autonomous traveling restraint unit 46 enables the start of the autonomous traveling control only when the antenna unit 50 is in the normal use position. Accordingly, the vehicle body can travel autonomously and safely along the target traveling route with high accuracy based on accurate information acquired by the inertial measurement unit 25 and the GNSS antenna 26.

It is noted that, in the present embodiment, whether the antenna unit 50 is in the normal use position is detected based on the displacement information acquired from the inertial measurement unit 25, but whether the antenna unit 50 is in the normal use position may be determined based on a signal of an automatic switch for detecting a position displacement of the antenna unit 50 or a signal of a hard switch manually operated.

Next, a wiring structure of the harness 80 led out from the antenna unit 50 will be described.

Figure 10:
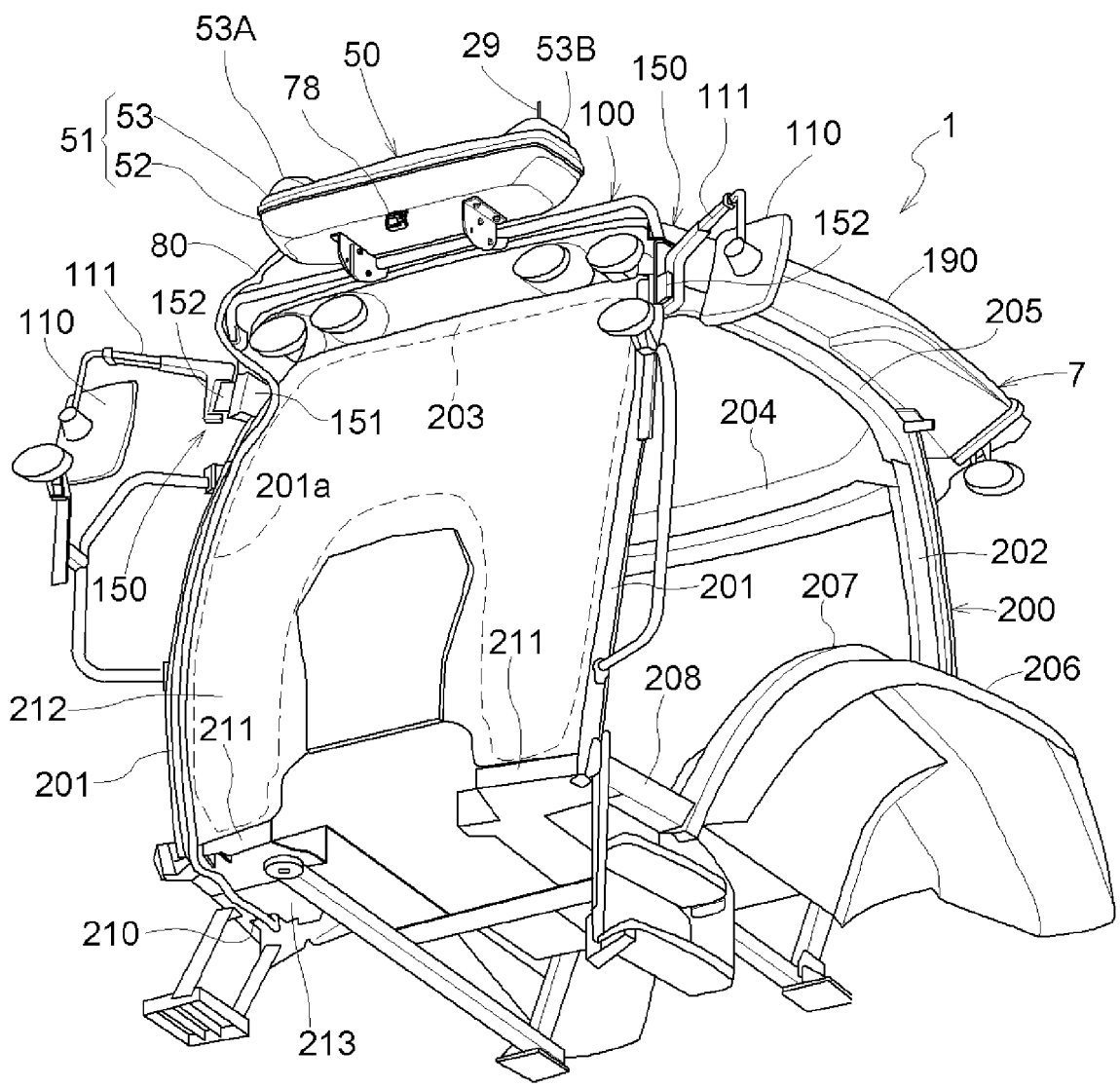
FIG. 10 is a perspective view of a cabin at an elevation angle.
Figure 11:
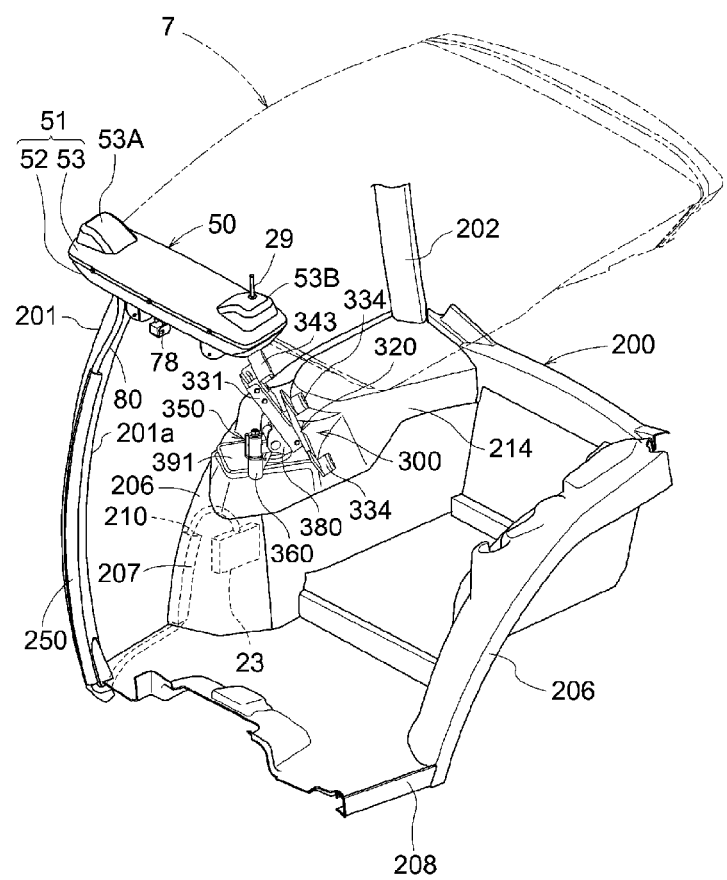
FIG. 11 is a perspective view of a main part of the cabin.

As illustrated in FIGS. 10 and 11, the cabin frame 200, in which the harness 80 is wired, is formed in a substantially box frame shape including the pair of left and right front pillars 201 located in front of the driver's seat 9, a pair of left and right rear pillars 202 located behind the driver's seat 9, a front beam member 203 coupling the upper ends of the front pillars 201, a rear beam member 204 coupling the upper ends of the rear pillars 202, and left and right side beam members 205 coupling the upper ends of the front pillars 201 and the rear pillars 202 which are arranged at the front and rear.

As illustrated in FIGS. 10 and 11, the lower end of each of the rear pillars 202 is coupled to an upper rear end of a fender frame 207 curved to bulge forward and upward in a side view to conform to the shape of a rear fender 206, and a lower front end of each of the fender frames 207 is coupled to the rear end of a side frame 208 protruding rearward from a lower part of the corresponding one of the front pillars 201.

As illustrated in FIG. 10, the fender frame 207 is formed of a cylindrical frame material. In the fender frame 207, the lower front end of the fender frame 207 located on the right side of the cabin 7 opens downward and outward from the cabin 7, and an internal space of the fender frame 207 located on the right side is formed as an internal/external communication passage 210 communicating the inside and outside of the cabin 7. A drain hose (not illustrated) for discharging condensed water in an air conditioner to the outside of the cabin 7 is provided in the internal/external communication passage 210 of the fender frame 207.

Further, a windshield 212 is placed in a region surrounded by the left and right front pillars 201, the front beam member 203, and lower front plate boards 211, extending inward from the lower ends of the front pillars 201 in the lateral direction.

As illustrated in FIGS. 10 and 11, at a right edge (an example of one side edge in the lateral width direction) on the outer surface of the windshield 212 of the cabin 7, the harness 80 led out from the antenna unit 50 extends downward along a band-shaped part overlapping a glass receiving part 201a of the front pillar 201 on the right side. The harness 80 reaching the lower front plate board 211 on the lower end side of the windshield 212 extends rearward along the lower surface of a floor plate support plate 213 continuously connected to the side frame 208, is then guided from the opening at the lower front end of the fender frame 207 located at the right side through the internal/external communication passage 210 into the cabin 7, and is connected to the control unit 23 placed in an operation panel unit 214 on the right side.

The band-shaped part overlapping the glass receiving part 201a of the front pillar 201 on the right side at a right side edge on the outer surface of the windshield 212 is a glass attaching part for attaching the windshield 212 to the front part of the cabin 7, and is also in a position where the band-shaped part does not interfere with a driver's vision. Therefore, when the harness 80 led out from the antenna unit 50 is placed in the above-described band-shaped part, it is possible to place the harness 80 having a good appearance and maintaining the visibility of an operator seated on the driver's seat 9 in a good condition.

Figure 12:
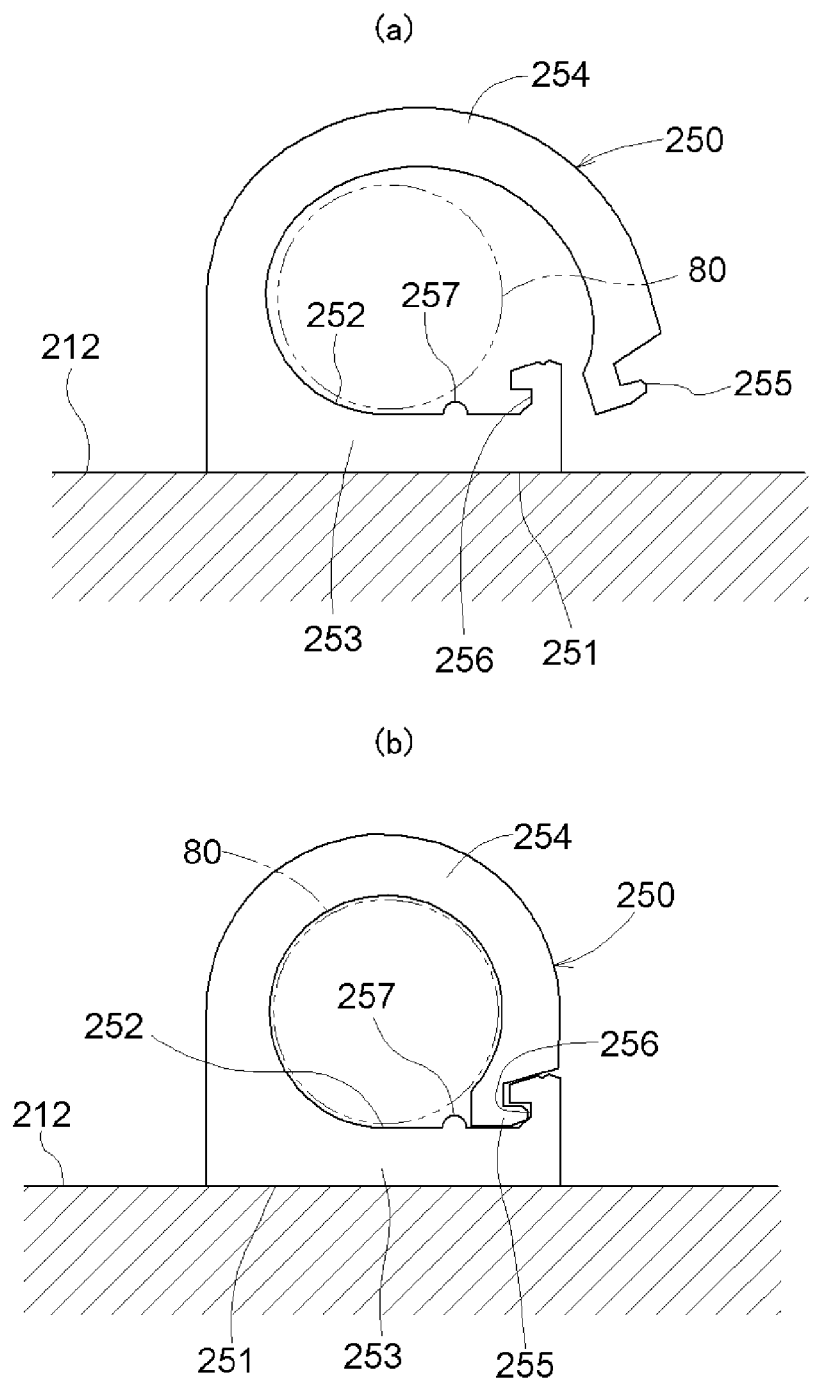
FIGS. 12A and 12B are enlarged views of an end surface of a harness cover.

Further, as illustrated in FIG. 11, a protective harness cover 250 made of resin into which the harness 80 is inserted is adhered to the band-shaped part at the right side edge on the outer surface of the windshield 212 with an adhesive or the like. As illustrated in FIGS. 12A and 12B, the harness cover 250 includes a base part 253 including an adhesion surface 251 for adhesion to the windshield 212 and a harness receiving surface 252 for receiving the harness 80, and a flexible band part 254 that is integrally formed with one end of the base part 253 in the width direction, placed on the harness receiving surface 252 of the base part 253, and curved in an arc shape along the outer peripheral surface of the base part 253.

An engagement claw 255 is formed at the distal end of the band part 254. An engagement concave part 256 for engagement with the engagement claw 255, and a semi-circular ridge 257 abutting against the rear surface of the engagement claw 255 engaged with the engagement concave part 256 to restrict engagement/disengagement of the engagement claw 255 in the abutted state are formed in a portion at the other end side in the width direction of the harness receiving surface 252 of the base part 253.

Therefore, as illustrated in FIG. 12A, if the engagement between the engagement claw 255 and the engagement concave part 256 is released, the harness 80 can be inserted into the harness cover 250 from the gap between the base part 253 and the band part 254 to arrange the harness 80 so that the harness receiving surface 252 receives a part of the outer periphery of the harness 80. As illustrated in FIG. 12B, if the engagement claw 255 and the engagement concave part 256 are engaged, the base part 253 and the band part 254 are coupled, and the harness 80 can be mounted in the harness cover 250 in a state where the harness 80 is received by the harness receiving surface 252 over the entire circumference of the outer periphery of the harness 80.

Next, the arrangement of the tablet terminal 48 arranged in the cabin 7 will be described.

Figure 13:
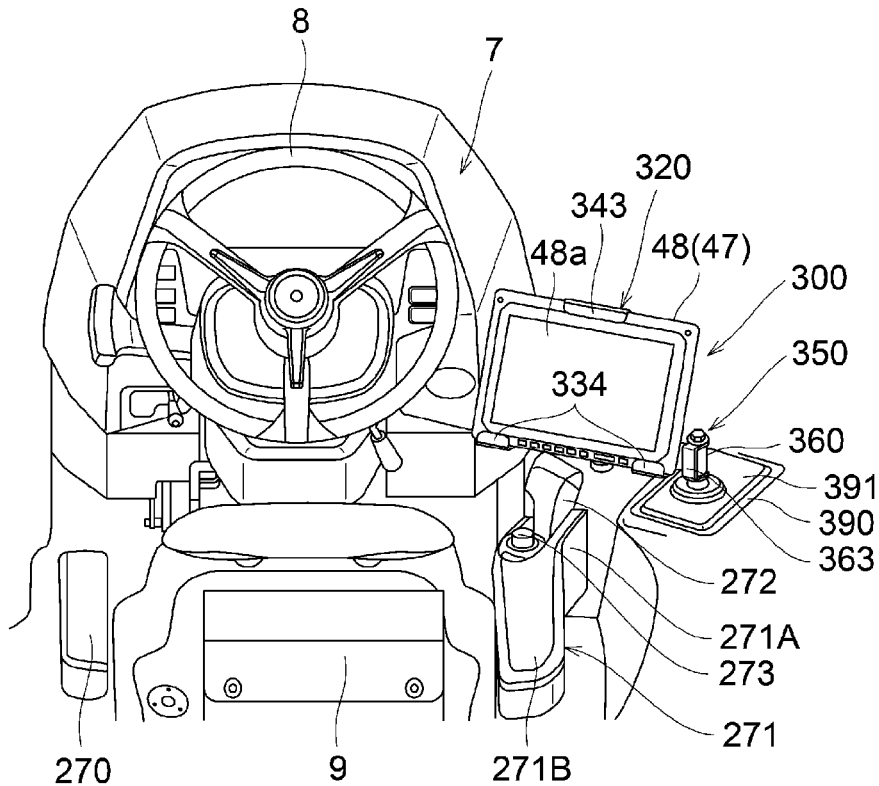
FIG. 13 is a view of an operational layout in the cabin.

As illustrated in FIGS. 11 and 13, the tablet terminal 48 is arranged above the front end of the operation panel unit 214 on the right side in the cabin 7. An installation position of the tablet terminal 48 is on a line extending to the front of a right armrest 271 out of an armrest 270 and the armrest 271 arranged on both the left and right sides of the driver's seat 9. Specifically, a front half part 271A of the right armrest 271 is configured in an inclined posture in which the front half part 271A is closer to the right toward the front end side of the front half part 271A with respect to a rear half part 271B along the front-rear direction. A main transmission lever 272 for increasing or decreasing the traveling speed of the tractor 1, a dial-type work unit position dial 273 for manually changing and adjusting the height position of a work machine such as a rotary tilling machine, and the like are provided at the front half part 271A.

An operator seated in the driver's seat 9 typically puts an arm or elbow on the armrests 270 and 271. Therefore, particularly, the tablet terminal 48 is provided on the line extending to the front of the front half part 271A of the right armrest 271, and thus, it is possible to easily operate the tablet terminal 48 similarly to the operation on the main transmission lever 272, the work unit position dial 273, and the like.

Further, as illustrated in FIG. 13, the tablet terminal 48 is arranged at a position slightly displaced to the right of the steering handle 8. This arrangement position of the tablet terminal 48 does not hinder the forward field of view of the operator seated in the driver's seat 9 during working. Moreover, the operator can easily view the entirety of a liquid crystal screen 48a of the tablet terminal 48 by slightly turning the eyes of the operator while viewing the front for performing work.

Next, a terminal support device 300 configured to support the tablet terminal 48 will be described.

As illustrated in FIGS. 14 to 17, the terminal support device 300 includes a support strut 310 fixed to a side of the fender frame 207 on the right side of the cabin frame 200, a terminal holder 320 configured to detachably hold the tablet terminal 48, and a terminal position adjustment mechanism 350 configured to attach the terminal holder 320 to the support strut 310 so that the position of the terminal holder 320 can be adjusted three-dimensionally.

As illustrated in FIGS. 14 to 17, the terminal position adjustment mechanism 350 includes a first movable arm 360 attached to be pivotable around a first vertical axis Y1 (see FIGS. 15 and 17) along the vertical direction with respect to a cylindrical pipe support strut 311 which is a constituent member of the support strut 310 and is along the vertical direction, and to be adjustable in height in the direction of the first vertical axis Y1, and a second movable arm 380 attached to be pivotable around a second vertical axis Y2 (see FIGS. 15 and 17) along the vertical direction with respect to the distal end of the first movable arm 360. The terminal holder 320 is attached to the distal end of the second movable arm 380 to be pivotable around a horizontal axis X (see FIGS. 15 and 17) along the horizontal direction. The elevation angle of the liquid crystal screen 48a of the tablet terminal 48 held by the terminal holder 320 can be adjusted by pivoting the terminal holder 320 around the horizontal axis X.

Figure 14:
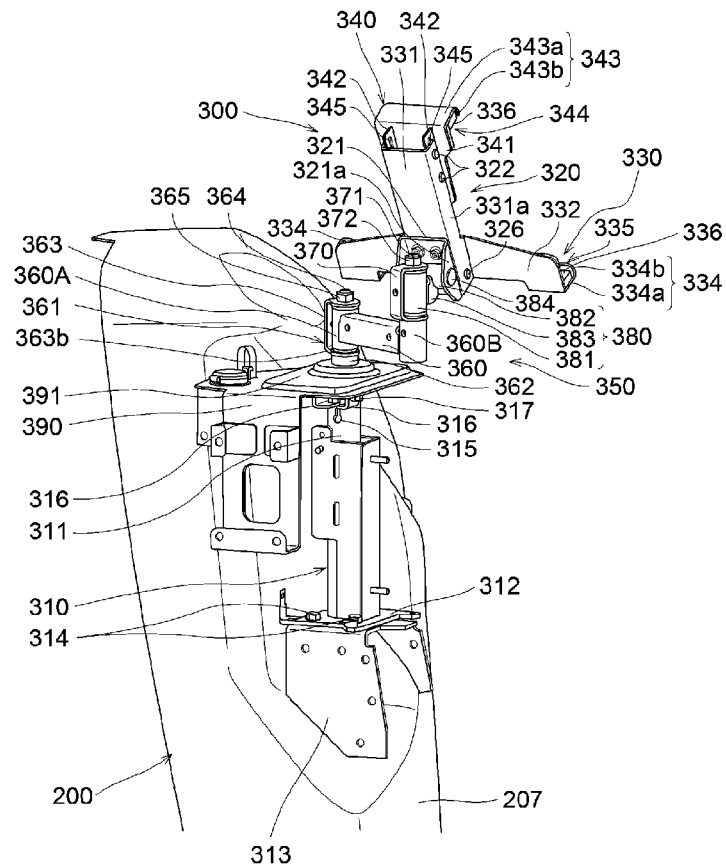
FIG. 14 is a rear side perspective view of an entire terminal support device.

As illustrated in FIG. 14, a substantially rectangular mounting plate 312 is fixed to the lower end of the pipe support strut 311 of the support strut 310. The mounting plate 312 is fixed by bolts 314 to a substantially U-shaped first bracket 313 that is fixed to the fender frame 207 on the right side.

Figure 15:
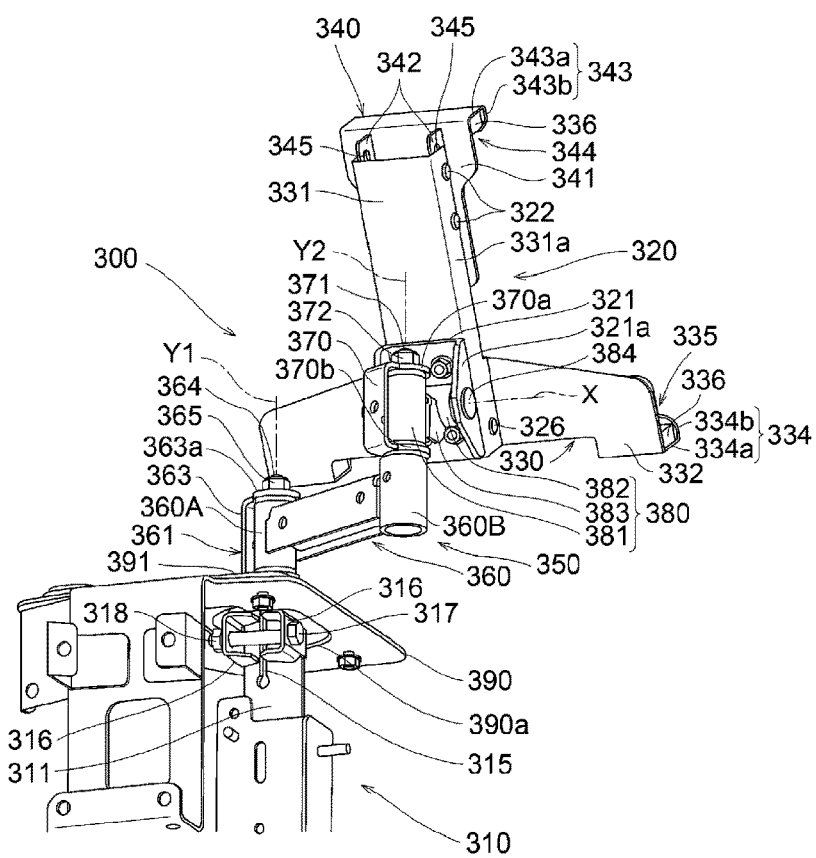
FIG. 15 is an enlarged rear side perspective view of a main part of the terminal support device.

Further, as illustrated in FIGS. 14 and 15, a slit 315 is formed along the direction of the first vertical axis Y1 at the upper end of the pipe support strut 311, and coupling members 316 bent to be formed into a U-shape are fixed to both sides of the slit 315. As illustrated in FIG. 15, an adjustment bolt 317 is inserted across both of the coupling members 316, and a nut 318 is screwed to the distal end portion of a male screw part of the adjustment bolt 317. With a screwing operation of the adjustment bolt 317 and the nut 318 to be screwed, the coupling members 316 are close to each other, and the inner diameter of the upper end part of the pipe support strut 311 is reduced. As a result, as illustrated in FIG. 17, a first shaft member 361 on the proximal end side of the first movable arm 360 slidably inserted into the upper end part of the pipe support strut 311 is clamped and fixed, and thus, the orientation around the first vertical axis Y1 of the first shaft member 361 and the height position in the direction of the first vertical axis Y1 of the first movable arm 360 are fixed.

Figure 16:
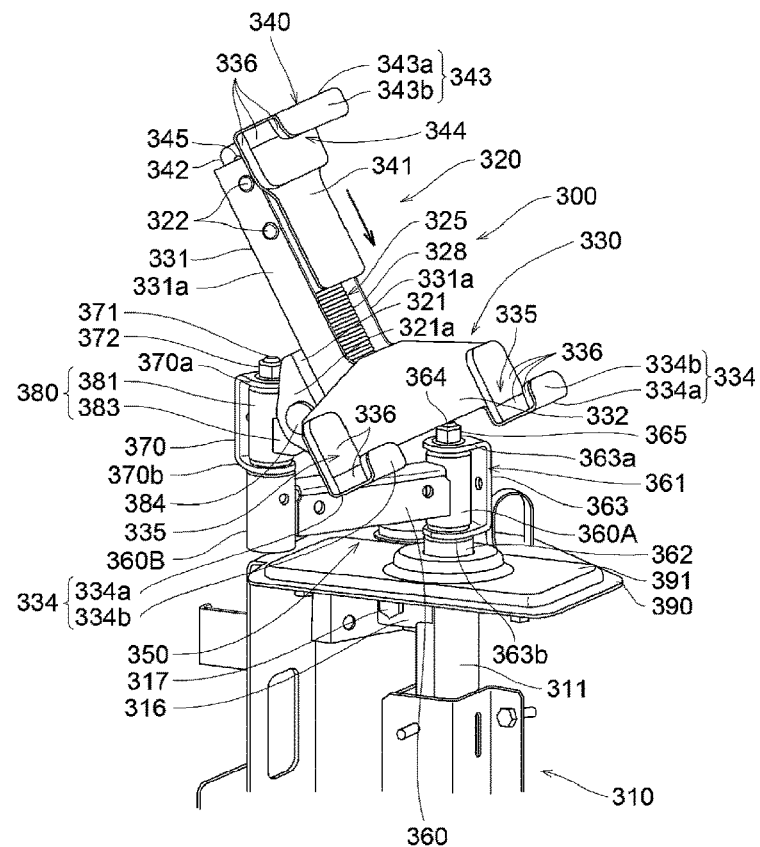
FIG. 16 is an enlarged front side perspective view of the main part of the terminal support device.
Figure 17:
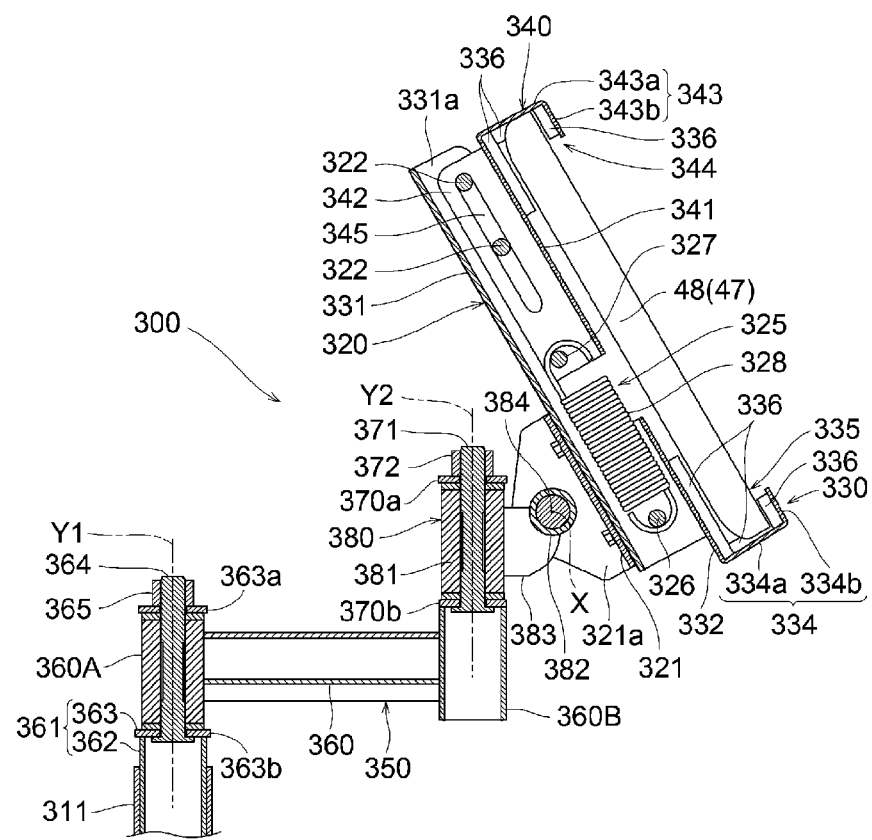
FIG. 17 is a sectional view of the main part of the terminal support device.

As illustrated in FIGS. 16 and 17, the first shaft member 361 is configured in which a first boss receiving part 363 that is bent to be formed in a U-shape is fixed to the upper end of a tubular shaft part 362 inserted into the upper end part of the pipe support strut 311. As illustrated in FIGS. 15 to 17, a tubular first boss part 360A formed at the proximal end of the first movable arm 360 is inserted and arranged between a first upper plate part 363a and a first lower plate part 363b of the first boss receiving part 363. As illustrated in FIG. 17, a first support shaft 364 penetrating the first boss part 360A is provided across the first upper plate part 363a and the first lower plate part 363b of the first boss receiving part 363. A first nut 365 is screwed onto the male screw part on the upper end of the first support shaft 364. The first boss part 360A of the first movable arm 360 is configured to be rotatable around the first vertical axis Y1 being the axial center of the first support shaft 364 with respect to the first boss receiving part 363 of the first shaft member 361, and is configured to be freely fixed in any orientation around the first vertical axis Y1.

As illustrated in FIGS. 14 to 17, a second boss receiving part 370 bent to be formed into a U-shape is fixed to an upper end of a tubular second boss part 360B formed at the distal end of the first movable arm 360.

A tubular third boss part 381 formed at the proximal end of the second movable arm 380 is inserted and arranged between a second upper plate part 370a and a second lower plate part 370b of the second boss receiving part 370. As illustrated in FIGS. 16 and 17, a second support shaft 371 penetrating the third boss part 381 is provided across the second upper plate part 370a and the second lower plate part 370b of the second boss receiving part 370, and a second nut 372 is screwed onto the male screw part on the upper end of the second support shaft 371. The third boss part 381 of the second movable arm 380 is configured to be rotatable with respect to the second boss receiving part 370 of the first movable arm 360 around the second vertical axis Y2 being the axial center of the second support shaft 371, and is configured to be freely fixed in any orientation around the second vertical axis Y2.

As illustrated in FIGS. 14 to 17, the second movable arm 380 includes the third boss part 381 arranged along the direction of the second vertical axis Y2, a fourth boss part 382 arranged along the direction of the horizontal axis X, and a continuous part 383 configured to integrally join the two boss parts 381 and 382. A second bracket 321 substantially formed in a U-shape in a plan view, is fixed to a lower end of the rear surface of the terminal holder 320. As illustrated in FIGS. 14, 15, and 17, the fourth boss part 382 of the second movable arm 380 is inserted and arranged between left and right side plates 321a of the second bracket 321. A third support shaft 384 penetrating the fourth boss part 382 is provided across both of the side plates 321a of the second bracket 321. A third nut (not illustrated) is screwed onto the male screw part at one end of the third support shaft 384. The second bracket 321 of the terminal holder 320 is configured to be rotatable with respect to the fourth boss part 382 of the second movable arm 380 around the horizontal axis X being the axial center of the third support shaft 384, and is configured to be freely fixed in any orientation around the horizontal axis X.

As described above, the position and orientation of the tablet terminal 48 held by the terminal holder 320 can be three-dimensionally adjusted in accordance with individual users having different height, posture, and habits by adjusting the orientation around the first vertical axis Y1 and the height in the direction of the first vertical axis Y1 of the first movable arm 360 with respect to the support strut 310, adjusting the orientation of the second movable arm 380 around the second vertical axis Y2 with respect to the first movable arm 360, and adjusting the orientation of the terminal holder 320 around the horizontal axis X with respect to the second movable arm 380.

Further, in a state where the first movable arm 360 is fixed to the support strut 310, the second movable arm 380 is fixed to the first movable arm 360, and the terminal holder 320 is fixed to the second movable arm 380, the rigidity of the terminal position adjustment mechanism 350 is sufficiently ensured, and the influence of a vibration on the tablet terminal 48 mounted on the terminal holder 320 can be minimized. Further, the support strut 310 is attached to the cabin frame 200 provided with vibration countermeasures, and thus, it is possible to suppress the influence of the vibration on the tablet terminal 48.

As illustrated in FIGS. 14 to 17, the terminal holder 320 includes a fixed holder part 330 configured to support the lower end of the tablet terminal 48 and a movable holder part 340 configured to support the upper end of the tablet terminal 48. The movable holder part 340 is configured to be slidable in the vertical direction along the fixed holder part 330. As illustrated in FIGS. 16 and 17, a holding urging part 325 configured to move and urge the movable holder part 340 is provided between the movable holder part 340 and the fixed holder part 330, on the lower side being the holding side of the tablet terminal 48.

As illustrated in FIGS. 14 to 17, the fixed holder part 330 includes a fixed mounting base 331 formed by bending left and right side plates 331a forward and upward and having a substantially U-shaped cross section, a fixed support plate 332 fixed across the lower end of the two side plates 331a of the fixed mounting base 331, and the second bracket 321 fixed to the lower end of the rear surface of the fixed mounting base 331.

As illustrated in FIGS. 14 to 17, a lower support part 334 including a mounting plate part 334a configured to mount and support the lower end of the tablet terminal 48, and a retaining plate part 334b protruding upward from the tip end of the mounting plate part 334a are formed at both side portions in the lateral direction of the fixed support plate 332. The fixed support plate 332 and the two lower support parts 334 form a lower catch concave part 335 for inserting the lower end of the tablet terminal 48 from above, and an elastic buffer material 336 such as silicone sponge rubber is attached to the inner surface of the lower catch concave part 335.

As illustrated in FIGS. 14 to 17, in the movable holder part 340, a pair of left and right side plates 342 slidable in the vertical direction along the inner surface of the two side plates 331a of the fixed mounting base 331 are fixed to the rear surface of a movable support plate 341. An upper support part 343, including a holding plate part 343a configured to hold and support the upper end of the tablet terminal 48 and a retaining plate part 343b protruding downward from the tip end of the holding plate part 343a, is formed at the upper end of the movable support plate 341. The movable support plate 341 and the upper support part 343 form an upper catch concave part 344 for inserting the upper end of the tablet terminal 48 from below, and the elastic buffer material 336 such as the silicone sponge rubber is attached to the inner surface of the upper catch concave part 344.

The vibration of the tablet terminal 48 mounted on the terminal holder 320 can be suppressed by the elastic buffer material 336 provided in the lower catch concave part 335 of the fixed holder part 330, and the elastic buffer material 336 provided in the upper catch concave part 344 of the movable holder part 340.

As illustrated in FIGS. 15 to 17, long holes 345 configured to restrict the movable range of the movable support plate 341 are formed on the two side plates 342 of the movable support plate 341. On the two side plates 331a of the fixed mounting base 331, two slide guide rods 322 are horizontally arranged to penetrate the long holes 345 of the two side plates 342 of the movable support plate 341. Therefore, the position where the upper ends of the two long holes 345 of the movable holder part 340 contact the upper slide guide rod 322 of the fixed holder part 330 is the lowest position of the movable holder part 340 with respect to the fixed holder part 330. The position where the lower ends of the two long holes 345 of the movable holder part 340 contact the lower slide guide rod 322 of the fixed holder part 330 is the highest position of the movable holder part 340 with respect to the fixed holder part 330.

As illustrated in FIG. 17, the holding urging part 325 includes a lower spring hooking member 326 arranged horizontally on the lower ends of the two side plates 331a of the fixed mounting base 331, an upper spring hooking member 327 arranged horizontally on the lower ends of the two side plates 342 of the movable support plate 341, and a tension coil spring 328 retained between the two spring hooking members 326 and 327. With the tension coil spring 328, the movable holder part 340 is urged to move to the lowest position with respect to the fixed holder part 330.

Therefore, when the tablet terminal 48 is mounted on the terminal holder 320, the upper end of the tablet terminal 48 is inserted from below the upper catch concave part 344 of the movable holder part 340 and in this state, the movable holder part 340 is pushed upward against the elastic urging force of the tension coil spring 328. When the lower end of the tablet terminal 48 exceeds the upper end of the lower catch concave part 335 of the fixed holder part 330, the lower end of the tablet terminal 48 is inserted into the two lower catch concave parts 335 of the fixed holder part 330. In this mounted state, the tablet terminal 48 is securely held by the elastic urging force of the tension coil spring 328 at three points, that is, the two lower catch concave parts 335 of the fixed holder part 330 and the upper catch concave part 344 of the movable holder part 340.

The upper end of the pipe support strut 311 of the support strut 310 faces the upper front end of the operation panel unit 214. Furthermore, the first shaft member 361 of the first movable arm 360 penetrates the upper front end of the operation panel unit 214. As illustrated in FIG. 15, a through hole 390a communicating with the opening of the operation panel unit 214 is also formed in a device mounting member 390 fixed to the upper front end of the operation panel unit 214. The opening of the operation panel unit 214 and the through hole 390a of the device mounting member 390 are formed in a size that allows for operation of the adjustment bolt 317 inserted into the two coupling members 316 of the pipe support strut 311 and the nut 318, using a hand, a finger, or a tool from above and from the outside.

Further, a flexible rubber cover 391 covering the through hole 390a of the device mounting member 390 is provided. If the rubber cover 391 is rolled up, the through hole 390a of the device mounting member 390 is exposed.

Other Embodiments (1) In the above-described embodiment, the wireless communication antenna 28 of the wireless communication unit 27 is housed inside the unit cover 51 of the antenna unit 50. However, as required, the wireless communication antenna 28 may protrude outward and upward from a through hole formed in the upper cover body 53.

(2) In the above-described embodiment, the first predetermined distance L1 between the wireless communication antenna 28 of the wireless communication unit 27 and the central part of the inertial measurement unit 25 is set to 250 mm or more. However, the first predetermined distance L1 can be set to any value according to the radio interference conditions between the wireless communication unit 27 and the inertial measurement unit 25.

(3) In the above-described embodiment, the second predetermined distance L2 between the inner surface 53a of the first bulge part 53A and the upper ends of the wireless communication antennas 28 is set to 30 mm or more. However, the second predetermined distance L2 can be set to any value according to the communication state between the wireless communication unit 27 and the wireless communicator 31 of the wireless communication terminal 30.

(4) In the above-described embodiment, the pair of left and right stays 75 are mounted on the lower surface side of the unit cover 51. However, the mounting structure is not limited to this, and any mounting structure can be adopted according to the mounting condition of both sides of the work vehicle.

(5) In the above-described embodiment, the inertial measurement unit 25 and the GNSS antenna 26 are separately formed. However, the inertial measurement unit 25 and the GNSS antenna 26 may be integrally formed.

INDUSTRIAL APPLICABILITY

The present invention can be applied to various types of work vehicles provided with a cabin.

DESCRIPTION OF REFERENCE NUMERALS

1 Work vehicle (tractor)
7 Cabin
23 Control unit
25 Inertial measurement unit
26 GNSS antenna
27 Wireless communicator (wireless communication unit)
29 Wireless communicator (base station antenna)
46 Autonomous traveling restraint unit
50 Antenna unit
80 Harness
100 Support frame
150 Mirror mounting part
200 Cabin frame
201 Front pillar
201a Glass receiving part
210 Internal/external communication passage

The invention claimed is:

1. A work vehicle comprising a cabin,
wherein a support frame extending in a lateral width direction is fixed to a cabin frame at an upper position outside the cabin, and
wherein an antenna unit is attached to the support frame via a bracket and the antenna unit with respect to the support frame is mounted displaceably from a normal use position protruding above a roof of the cabin to a non-use position in which the antenna unit and the bracket are lower than the highest position of the roof.

2. The work vehicle according to claim 1, wherein the support frame is coupled to mirror mounting parts provided on both lateral sides of the cabin frame to extend between the mirror mounting parts.

3. The work vehicle according to claim 1, comprising:
a control unit configured to perform autonomous traveling control of the vehicle body; and
an autonomous traveling restraint unit configured to restrict start of the autonomous traveling control by the control unit unless it is detected that the antenna unit is in the normal use position.

4. The work vehicle according to claim 1, wherein a control unit configured to perform autonomous traveling control of the vehicle body is provided in the cabin, and a harness led out from the antenna unit is arranged to reach the control unit in the cabin via an internal/external communication passage provided in the cabin frame.

5. The work vehicle according to claim 3, wherein a harness led out from the antenna unit is arranged at one side edge in the lateral width direction on an outer surface of a windshield of the cabin and extends along a band-shaped part overlapping with a glass receiving part of a front pillar of the cabin.

6. A work vehicle comprising:
a cabin;
an antenna unit having a receiver for receiving position information;
a support frame supporting the antenna unit; and,
a pair of left and right front pillars,
wherein the left side of the support frame is supported by the left front pillar, and the right side of the support frame is supported by the right front pillar.

7. The work vehicle according to claim 6,
wherein the left and right front pillars are coupled to mirror mounting parts.

8. The work vehicle according to claim 6, wherein the antenna unit is located at a center position in the lateral width direction of a vehicle body.

9. The work vehicle according to claim 6,
wherein at least a portion of the antenna unit protrudes in front of and above the left and right front pillars.

* * * * *